United States Patent
Baek et al.

(10) Patent No.: US 10,123,365 B2
(45) Date of Patent: Nov. 6, 2018

(54) METHOD AND APPARATUS FOR SPECIFIED ATTACH PROCEDURE AND MOBILITY AND PAGING SUPPORT IN DATA COMMUNICATION NETWORK

(71) Applicant: Samsung Electronics Co., Ltd., Suwon-si, Gyeonggi-do (KR)

(72) Inventors: Youngkyo Baek, Seoul (KR); Sunghoon Kim, Seoul (KR); Jungje Son, Yongin-si (KR); Hoyeon Lee, Seongnam-si (KR); Duckey Lee, Seoul (KR); Jonghan Park, Bucheon-si (KR); Hyewon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/641,640

(22) Filed: Jul. 5, 2017

(65) Prior Publication Data

US 2018/0014339 A1    Jan. 11, 2018

(30) Foreign Application Priority Data

Jul. 5, 2016    (KR) ........................ 10-2016-0085051

(51) Int. Cl.
*H04W 76/00*    (2018.01)
*H04W 76/10*    (2018.01)
*H04W 68/00*    (2009.01)
*H04W 92/04*    (2009.01)
*H04W 76/12*    (2018.01)

(52) U.S. Cl.
CPC ........... *H04W 76/10* (2018.02); *H04W 68/00* (2013.01); *H04W 76/12* (2018.02); *H04W 92/045* (2013.01); *H04W 68/005* (2013.01)

(58) Field of Classification Search
CPC ..... H04W 52/02; H04W 68/00; H04W 68/02; H04W 68/025; H04W 68/12
See application file for complete search history.

(56) References Cited

U.S. PATENT DOCUMENTS

| | | |
|---|---|---|
| 8,965,366 B1 | 2/2015 | Somayajula et al. |
| 9,378,043 B1 | 6/2016 | Zhang et al. |
| 2010/0061386 A1 | 3/2010 | Olsson et al. |

(Continued)

FOREIGN PATENT DOCUMENTS

WO    2015-042189 A1    3/2015

*Primary Examiner* — Sharad Rampuria
(74) *Attorney, Agent, or Firm* — Jefferson IP Law, LLP

(57) ABSTRACT

A method of combining a 5G communication system for supporting a data rate higher than that of a beyond 4G system with IoT technology, and a system thereof, are provided. The method by a mobility management (MM) function entity includes receiving a message including session information for a terminal in an idle mode, transmitting a paging message for the terminal based on the message, receiving a service request message for the terminal from a base station, transmitting an interface configuration request message including the session information to the base station based on the session information, receiving an interface configuration response message from the base station, and transmitting information for configuring an interface between a user plane gateway (UP GW) corresponding to the session information and the base station.

20 Claims, 28 Drawing Sheets

(56) References Cited

U.S. PATENT DOCUMENTS

| | | |
|---|---|---|
| 2010/0272115 A1 | 10/2010 | Ramankutty |
| 2011/0268086 A1 | 11/2011 | Liang et al. |
| 2012/0063464 A1* | 3/2012 | Mehta .................. H04W 28/02 370/401 |
| 2012/0135713 A1 | 5/2012 | Lee et al. |
| 2012/0207104 A1 | 8/2012 | Liang et al. |
| 2013/0157673 A1 | 6/2013 | Brusilovsky |
| 2015/0208291 A1 | 7/2015 | Lee et al. |
| 2015/0304988 A1* | 10/2015 | Jin ........................ H04W 68/02 455/458 |
| 2015/0312873 A1 | 10/2015 | Cormier et al. |
| 2016/0127132 A1 | 5/2016 | Lee et al. |
| 2016/0142855 A1 | 5/2016 | Yu |
| 2016/0227471 A1 | 8/2016 | De Foy et al. |
| 2017/0041733 A1 | 2/2017 | Babbage et al. |
| 2017/0111339 A1* | 4/2017 | Lee ......................... H04L 63/06 |
| 2017/0289788 A1 | 10/2017 | Lalwaney |
| 2017/0318450 A1* | 11/2017 | Salkintzis ............... H04W 8/02 |
| 2017/0339609 A1* | 11/2017 | Youn ..................... H04W 76/11 |
| 2017/0359768 A1* | 12/2017 | Byun ................... H04W 48/04 |

* cited by examiner

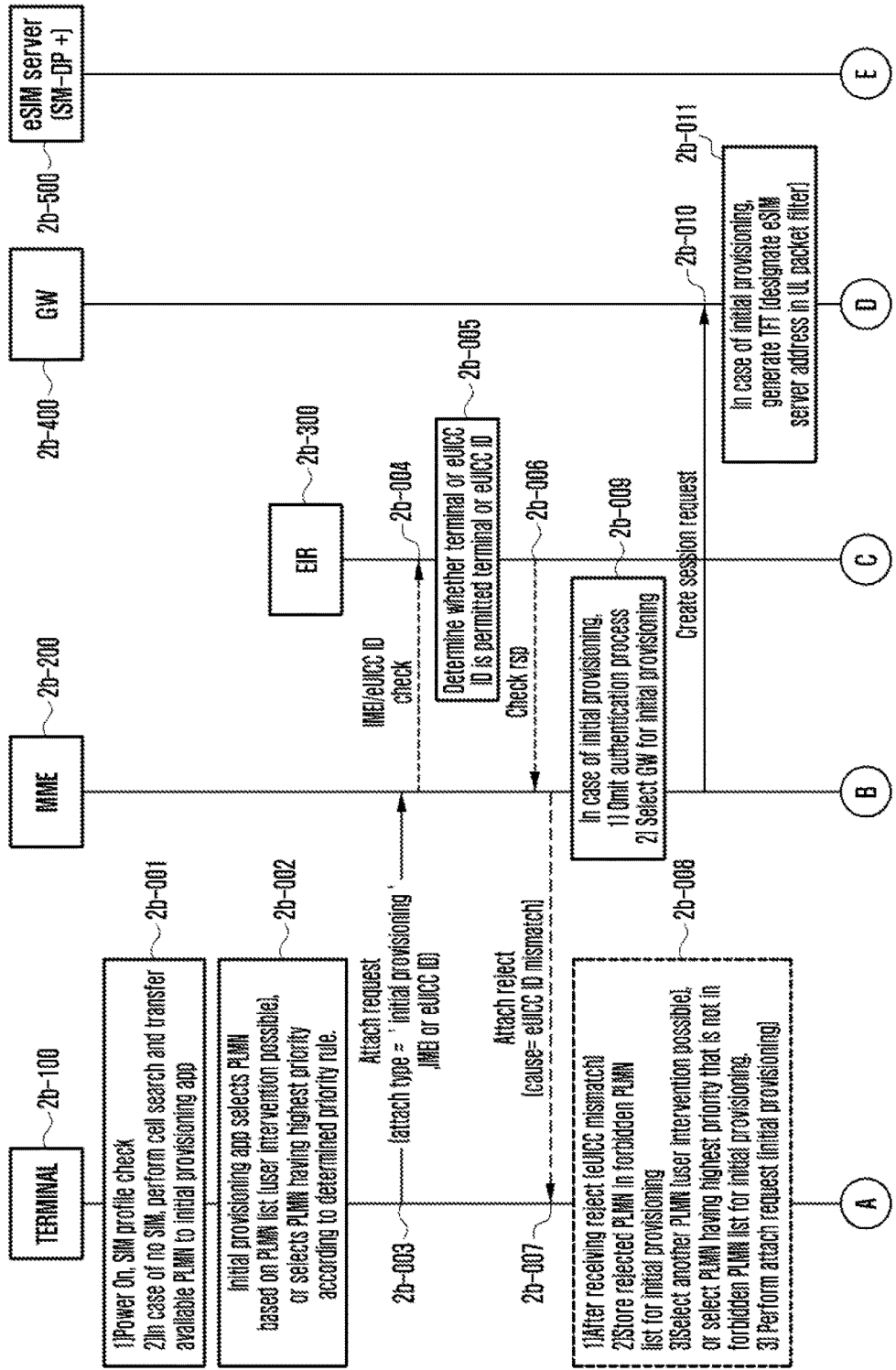

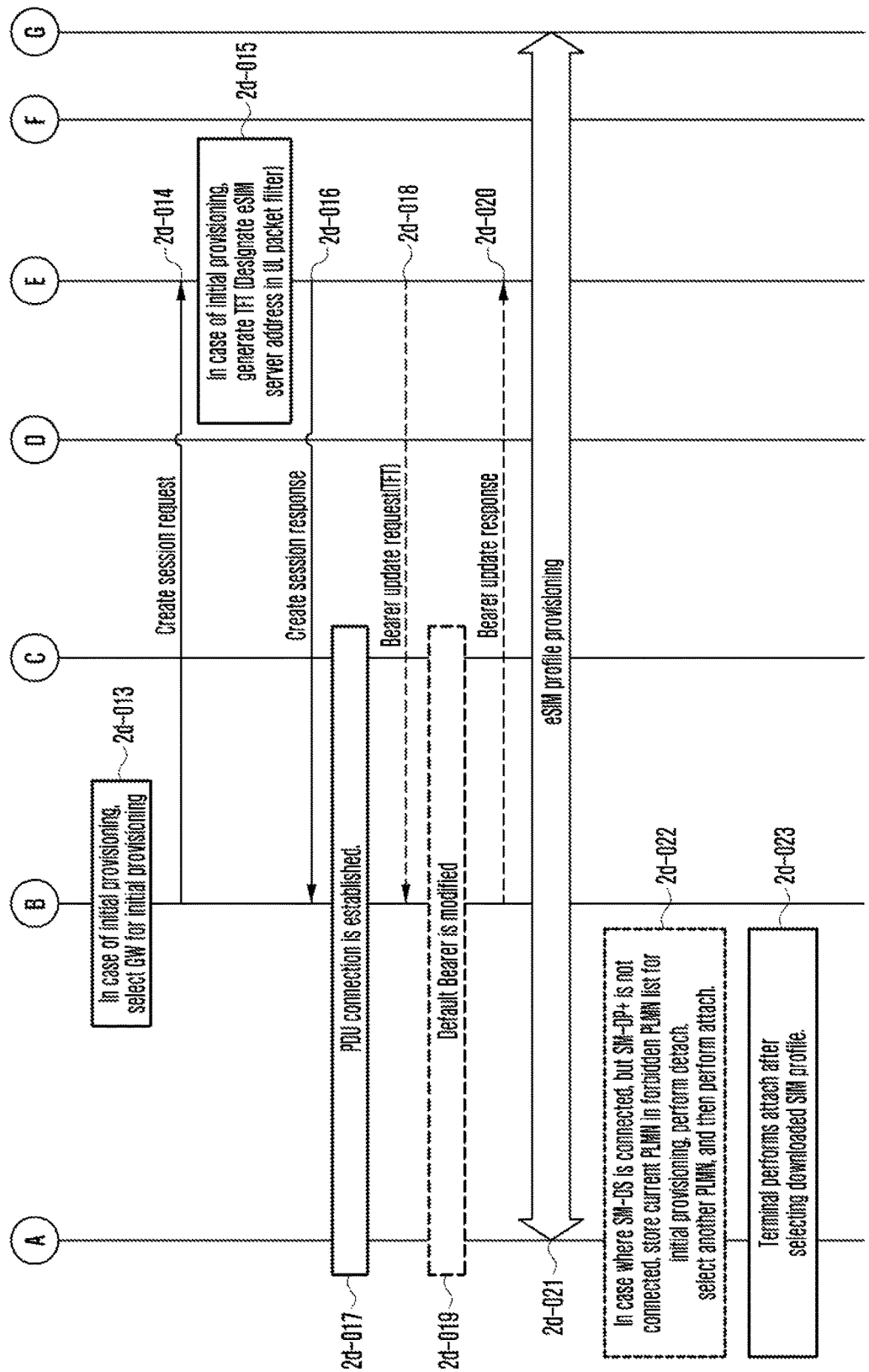

METHOD AND APPARATUS FOR SPECIFIED ATTACH PROCEDURE AND MOBILITY AND PAGING SUPPORT IN DATA COMMUNICATION NETWORK

CROSS-REFERENCE TO RELATED APPLICATION(S)

This application claims the benefit under 35 U.S.C. § 119(a) of a Korean patent application filed on Jul. 5, 2016 in the Korean Intellectual Property Office and assigned Serial number 10-2016-0085051, the entire disclosure of which is hereby incorporated by reference.

TECHNICAL FIELD

The present disclosure relates to vehicle-to-everything (V2X) technology using a mobile communication network. More particularly, the present disclosure relates to V2X communication technology through all interfaces with vehicles. V2X has vehicle-to-vehicle (V2V), vehicle-to-infrastructure (V2I), and vehicle-to-pedestrian (V2P), which respectively mean vehicle-to-vehicle communication, vehicle-to-communication network/infrastructure communication, and vehicle-to-pedestrian communication.

BACKGROUND

In a mobile communication network, a vehicle-to-everything (V2X) service takes aim at wireless network construction for effectively transferring information that is transmitted and received through a vehicle to prevent an accident, to improve driving convenience, and to increase energy saving and traffic efficiency.

Further, according to the present disclosure, if a terminal does not have a subscriber identification module (SIM) profile like an open market oriented terminal having an embedded SIM (eSIM) mounted thereon, it is necessary for the terminal to download the SIM profile through attaching to an eSIM server, for example, a subscription manager data preparation plus (SM-DP+) or a subscription manager discovery service (SM-DS), in order to receive a normal cellular network service that is provided by a mobile network operator (MNO). However, there is a need for schemes to provide to a terminal packet data network (PDN) connectivity or packet data unit (PDU) connectivity for attaching to an eSIM server through a cellular network.

Further, the present disclosure relates to a method for a terminal to resume data communication in a mobile communication system that supports network slices.

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide two kinds of methods for transmitting a vehicle-to-everything (V2X) service in a long term evolution (LTE) network. First is a method for directly transferring data between terminals through device-to-device (D2D) communication using a PC5 interface, and second is a method for transferring data through terminal-to-base station communication using an LTE-Uu interface. The terminal may determine whether to transmit V2X data to a PC5 or an LTE-Uu based on information that is configured by the base station. The base station should determine whether to use the PC5, the LTE-Uu, or both of them in order to transmit the V2X data to the terminal. The present disclosure proposes a method for configuring a base station so that the base station can use the LTE-Uu if the base station is connected to a local network for the V2X service.

Further, in an aspect of the present disclosure, a local network connection in a V2X structure is not limited to one base station, but several adjacent base stations may share one local network. In the case of using a local network connection in the current $3^{rd}$ generation partnership project (3GPP) standard, handover is not supported, whereas in the case where several adjacent base stations share one local network, it is possible to reduce time that is consumed for a terminal to newly make a connection in a state where a local handover is supported. Accordingly, the present disclosure proposes schemes for handover support of a local network connection in a corresponding area if adjacent base stations share one local network.

Further, if a terminal does not have a subscriber identification module (SIM) profile like an open market oriented terminal having an embedded SIM (eSIM) mounted thereon, it is necessary for the terminal to download the SIM profile through attaching to an eSIM server, for example, a subscription manager data preparation plus (SM-DP+) or a subscription manager discovery service (SM-DS), in order to receive a normal cellular network service. However, there is a need for schemes to provide to the terminal packet data network (PDN) connectivity or packet data unit (PDU) connectivity for attaching to the eSIM server through a cellular network. In the related art, a terminal having no SIM profile may acquire the connectivity through a Wi-Fi network or a tethering method. However, the terminal is unable to have the connectivity in a situation where there is no pre-connected connectivity. Further, in the case where a terminal manufacturer sells a terminal after a provisioning profile that is provided by the manufacturer is pre-stored in an eSIM, there may be a method for acquiring a limited connectivity in a cellular network through the provisioning profile, downloading the SIM profile from the eSIM server through the acquired connectivity, and receiving a cellular network service through the downloaded SIM profile. However, this method may cause the problem that the terminal price is increased.

Another aspect of the present disclosure is to provide schemes for a terminal that is mounted with an eSIM having no SIM profile to acquire PDN connectivity or PDU connectivity through a cellular network.

Another aspect of the present disclosure is to provide a method for performing network reconnection so as to efficiently operate wireless resources and network resources of a mobile communication system that supports network slices if a terminal configures reconnection to the mobile communication system for transition from an idle state to a connected state.

In accordance with an aspect of the present disclosure, a method by a mobility management (MM) function entity is provided. The method includes receiving a message including session information for a terminal in an idle mode, transmitting a paging message for the terminal based on the message, receiving a service request message for the terminal from a base station, transmitting an interface configuration request message including the session information to the base station based on the session information, receiving an interface configuration response message from the base station, and transmitting information for configuring an interface between a user plane gateway (UP GW) corresponding to the session information and the base station.

In accordance with another aspect of the present disclosure, a mobility management (MM) function entity is provided. The MM function entity includes a transceiver configured to transmit and receive signals, and at least one processor configured to receive a message that includes session information for a terminal in an idle mode, transmit a paging message for the terminal based on the message, receive a service request message for the terminal from a base station, transmit an interface configuration request message including the session information to the base station based on the session information, receive an interface configuration response message from the base station, and transmit information for configuring an interface between a user plane gateway (UP GW) corresponding to the session information and the base station.

In accordance with another aspect of the present disclosure, a method for operating a session management (SM) function entity is provided. The method includes receiving information indicating that there is data to be transmitted from a user plane gateway (UP GW) to a terminal in an idle mode, transmitting an interface configuration request message including session information for the terminal to a mobility management (MM) function entity, and receiving from the MM function entity an interface configuration response message including information for configuring an interface between the UP GW that corresponds to the session information and a base station.

In accordance with another aspect of the present disclosure, a session management (SM) function entity is provided. The SM function entity includes a transceiver configured to transmit and receive signals, and at least one processor configured to receive information indicating that there is data to be transmitted from a user plane gateway (UP GW) to a terminal in an idle mode, transmit an interface configuration request message including session information for the terminal to a mobility management (MM) function entity, and receive from the MM function entity an interface configuration response message including information for configuring an interface between the UP GW that corresponds to the session information and a base station.

According to the present disclosure, V2X data should satisfy low latency and reliability. Accordingly, in order for a V2X terminal to transfer a V2X message that satisfies the low latency and reliability, a base station may configure a transmission path that is advantageous to send the V2X data to the terminal. For example, if the base station is not connected to a local network for V2X, it may configure a V2X data path to use only PC5. If the base station is connected to the local network for the V2X, it may configure the V2X data path to use an LTE-Uu.

Further, according to the present disclosure, a connection to the local network does not support mobility between base stations (handover is not supported). Since base stations that share one local network through the present disclosure are able to support handover for the local network connection between base stations, a terminal may continuously use the V2X service without the necessity of releasing the existing connection and performing reconnection.

Further, in the related art, a terminal having no SIM profile may acquire the connectivity through a Wi-Fi network or a tethering method. However, the terminal is unable to have the connectivity in a situation where there is no pre-connected connectivity. Further, in the case where a terminal manufacturer sells a terminal after a provisioning profile that is provided by the manufacturer is pre-stored in an eSIM, there may be a method for acquiring a limited connectivity in the cellular network through the provisioning profile, downloading the SIM profile from an eSIM server through the acquired connectivity, and receiving a cellular network service through the downloaded SIM profile. However, this method may cause the problem that the terminal price is increased. According to the present disclosure, a terminal that is mounted with the eSIM having no SIM profile can acquire the PDN connectivity or the PDU connectivity for provisioning of the SIM profile through the cellular network, and thus it becomes possible for the terminal to use a normal cellular service through provisioning of the SIM profile through the cellular network itself without using any other connectivity.

Further, according to the present disclosure, the terminal can perform the network reconnection that considers the network slices through which data communication is to be resumed during performing of the network reconnection, and thus the wireless resources and the network resources can be efficiently operated.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2B-1 and 2B-2 are diagrams illustrating network connection schemes for a terminal that is mounted with an eSIM to perform initial provisioning according to various embodiments of the present disclosure, FIGS. 2C-1 and 2C-2 are diagrams illustrating network connection schemes for a terminal that is mounted with an eSIM to perform initial provisioning according to various embodiments of the present disclosure, FIGS. 2D-1 and 2D-2 are diagrams illustrating network connection schemes for a terminal that is mounted with an eSIM to perform initial provisioning in consideration of an ID security according to various embodiments of the present disclosure.

Throughout the drawings, like reference numerals will be understood to refer to like parts, components, and structures.

DETAILED DESCRIPTION

Figure 1A:
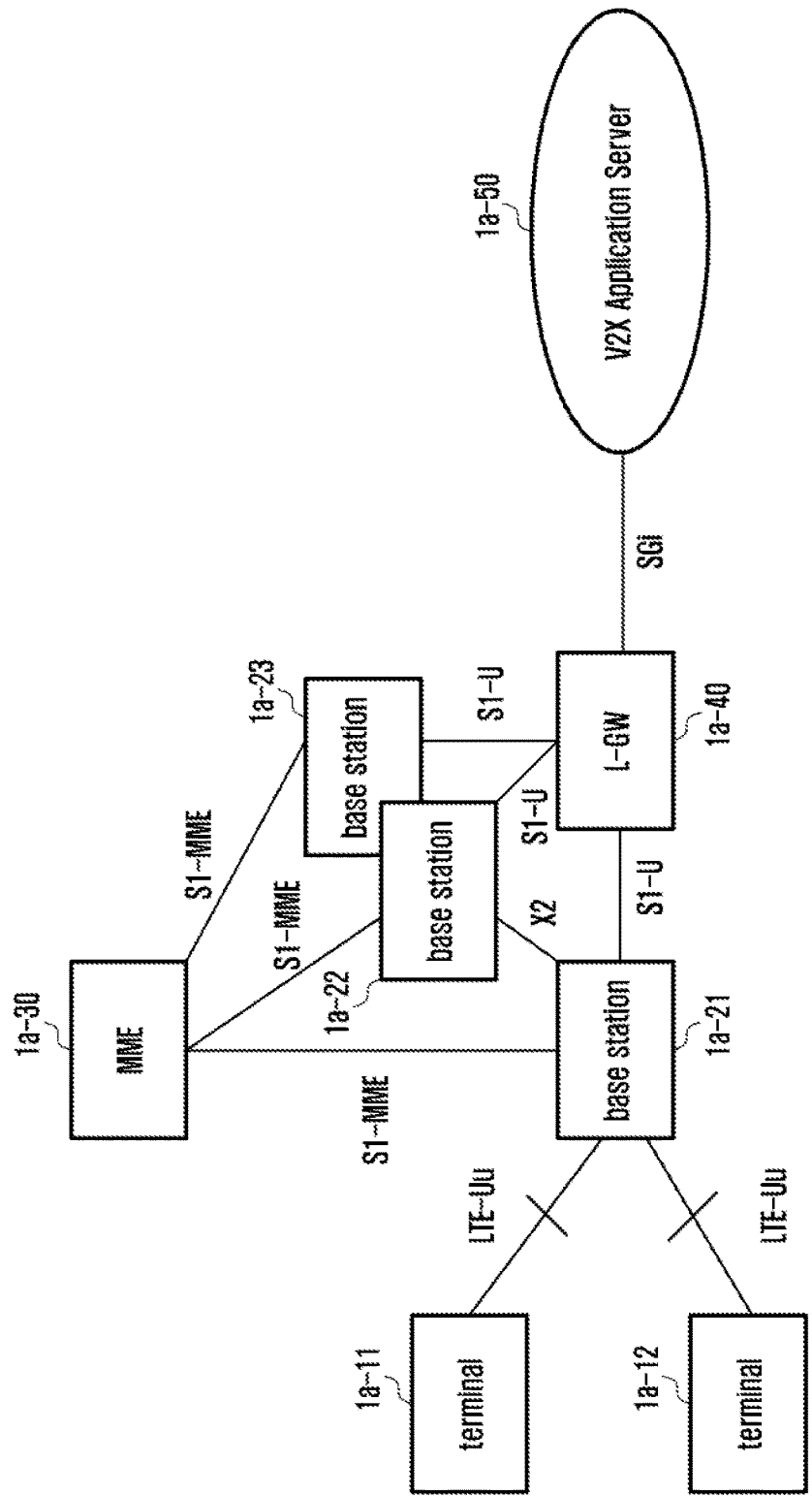
FIG. 1A is a diagram illustrating the structure of a mobile communication network in which a local network for a vehicle-to-everything (V2X) service is constructed according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art in that the following description of various embodiments of the disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the operation principle according to preferred embodiments of the present disclosure will be described in detail with reference to the accompanying drawings. The same reference numerals even in different drawings denote the same constituent elements indicated in the drawings. In describing the present disclosure below, related well-known functions or configurations incorporated herein are not described in detail in the case where it is determined that they obscure the subject matter of the present disclosure in unnecessary detail. Further, terms to be described later are terms defined in consideration of their functions in the present disclosure, but may differ depending on intentions of a user and an operator or customs. Accordingly, they should be defined on the basis of the contents of the whole description of the present disclosure.

The present disclosure may have various modifications and embodiments, and specific embodiments will be described in detail with reference to the drawings. However, this is not intended to limit the present disclosure to the specific embodiments, but it should be understood that the present disclosure includes all changes, equivalents, and substitutions that are included in the spirit and technical scope of the present disclosure.

Further, although the terms including ordinals, such as "first, second, and so forth", are used to describe diverse constituent elements, the above-described constituent elements are not limited by the terms. The terms may be used only to discriminate a constituent element from other constituent elements. For example, without departing from the scope of the present disclosure, a first constituent element may be called a second constituent element, and similarly, a second constituent element may be called a first constituent element. The term "and/or" includes a combination of a plurality of described items or any one of a plurality of described items.

Further, the terms used in the description are merely for explaining specific embodiments of the present disclosure, but do not intend to limit the scope of the present disclosure. A singular expression may include a plural expression unless specially described. It should be understood that the term "includes" or "has" used in the description is to designate the existence of features, figures, operations, constituent elements, components, or combinations thereof, and does not pre-exclude the existence or addition of one or more other features, figures, operations, constituent elements, components or combinations thereof.

Further, in embodiments of the present disclosure, unless specially defined, all terms (including technical and scientific terms) used in the description could be used as meanings commonly understood by those ordinary skilled in the art to which the present disclosure belongs. The terms that are generally used and are defined in the dictionary are to be interpreted as meanings that coincide with the contextual meanings of related technology, but are not interpreted ideally or excessively unless they have been clearly defined.

First Embodiment

In order to meet a wireless data traffic demand that is on an increasing trend after commercialization of the $4^{th}$ generation (4G) communication system, efforts for developing improved $5^{th}$ generation (5G) communication system or pre-5G communication system have been made. For this reason, the 5G communication system or pre-5G communication system has been called beyond 4G network communication system or post long term evolution (LTE) system.

Vehicle-to-everything (V2X) is an example of a transport means that is located on a road, and means a concrete communication technology for implementing "connected vehicle" or "networked vehicle" which is a general term that calls all communication types that can be applied to a vehicle. V2X networking is briefly divided into three kinds of communications, that is, vehicle-to-infrastructure (V2I), vehicle-to-vehicle (V2V), and vehicle-to-pedestrian (V2P) communications.

V2I and V2V technology has been developed to take aim at improvement of road safety, and in recent several years, it has been grafted on the development of wireless communication technology to cause various information technology (IT) additional services to be considered in addition to the initial safety-related use case. In principle advanced countries of telematics/ITS technologies, such as European Union, North America, Japan, and Korea, effectiveness and applicability of the technologies have been verified through large-scale projects over several years.

According to such tendency, the $3^{rd}$ generation partnership project (3GPP) group is proceeding with a standardization work for providing V2X communication based on LTE-Advanced. The service aspects (SA) group has defined requirements to be achieved during the V2X communication, and has agreed to utilize device-to-device (D2D) search and communication functions that are applied to a system after LTE Rel-12 for the V2V and V2P communications.

Further, during the V2I communication, it has been considered to communicate with a base station (or enhanced node B (eNB)) or a road-side-unit (RSU) which is communication equipment that is installed on a roadside by a network service provider. In this case, the RSU may be recognized as one of a base station and a terminal (or user equipment (UE)) with respect to surrounding vehicles. Accordingly, in the description of the present disclosure, an RSU type in the case where the RSU is recognized as an eNB may be defined as "eNB-type RSU," and an RSU type in the case where the RSU is recognized as UE may be defined as "UE-type RSU." During V2I communication between a vehicle and a UE-type RSU, in the same manner as the V2V and V2P communications, the existing D2D search and communication functions may be utilized. Further, during communication between a vehicle and an eNB or eNB-type RSU, the existing cellular up/down link transmission/reception-based communication technology may be utilized.

Hereinafter, explanation will be made with respect to a method in which a base station configures a wireless interface (PC5 or LTE-Uu) to be used for V2X data transmission to a terminal in a mobile communication network that is constructed for a V2X service, and a method for providing service continuity to a local network connection for a V2X service of a terminal in the case where handover occurs between base stations that are connected to the same local network.

FIG. 1A is a diagram illustrating the structure that configures a local network for V2X in order to provide a V2X service in a mobile communication network according to an embodiment of the present disclosure.

In V2X, low latency should be satisfied during data transmission. As a method for achieving low latency, a local gateway (L-GW) is put in a place that is near to a base station to be connected to a local server, and thus latency that occurs to transfer data in a network can be reduced. Accordingly, a V2X service provider may construct a local network for connecting a local V2X application server to a base station in a specific area.

Referring to FIG. 1A, a V2X application server 1a-50 may be an entity neighboring a local GW (L-GW) 1a-40 or a co-located entity. The V2X application server 1a-50 is connected to a V2X application server that manages the whole V2X service in a specific country or region, that is, a macro V2X application server, and performs synchronization between data that is transmitted or received by terminals 1a-11 and 1a-12 and states of the terminals 1a-11 and 1a-12. In the first embodiment of the present disclosure, the terminals 1a-11 and 1a-12 may be V2X-terminals or V2X-UE.

Referring to FIG. 1A, the L-GW 1a-40 is connected to several adjacent base stations 1a-21, 1a-22, and 1a-23. The base stations 1a-21, 1a-22, and 1a-23 transmit a packet data network (PDN) connection that is established for V2X to the L-GW 1a-40, and the L-GW 1a-40 transmits this to the V2X application server 1a-50. The base station 1a-21 may be connected to at least one terminal 1a-11 and 1a-12. Other base stations 1a-22 and 1a-23 may also be connected to other terminals. The base stations may be connected to one MM Entity (MME) 1a-30, or may be connected to different MMEs. In the case where the present disclosure is applied to a new radio (NR) system, the MME 1a-30 may be called a control function. The control function may be composed of a MM function and a session management (SM) function. The MM function may perform MM of the terminals 1a-11 and 1a-12, and may be connected to the base stations 1a-21, 1a-22, and 1a-23 to transfer a control signal related to the MM to the terminals 1a-11 and 1a-12. The SM function may manage a session in which the terminals 1a-11 and 1a-12 can perform a service through a data network, and may be connected to a user plane GW (UP GW) to manage data for the terminals 1a-11 and 1a-12.

Embodiment 1-1

Figure 1B:
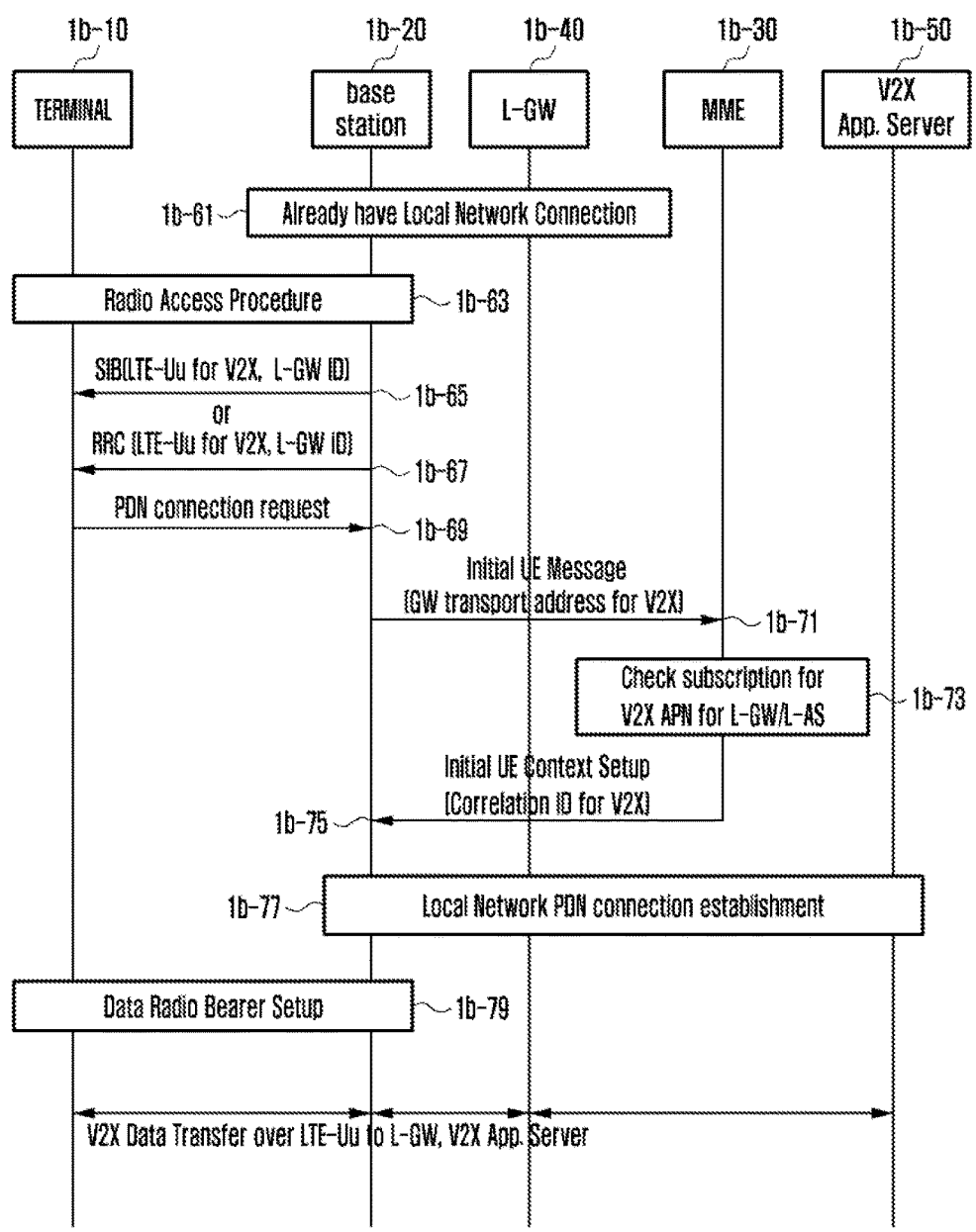
FIG. 1B is a diagram illustrating a procedure in which a base station configures a V2X data transmission path of a terminal with information based on a local network construction for a V2X service, and the terminal accesses the local network according to an embodiment of the present disclosure.

FIG. 1B is a diagram illustrating a procedure in which a base station configures a V2X data transmission path of a terminal with information based on a local network construction for a V2X service, and the terminal accesses the local network according to an embodiment of the present disclosure.

Referring to FIG. 1B, a system according to an embodiment of the present disclosure may include a terminal 1b-10, a base station 1b-20, an MME 1b-30, an L-GW 1b-40, and a V2X application server 1b-50. The MME may be called a control function, and the control function may include an MM function and an SM function. The application server may be a V2X application server. In the following embodiment, for convenience in explanation, the term "MME" is used, but the term and concept "control function" may be used instead of the MME. In the case of applying the control function, management of a control plane may be performed by the MM function, and management of a user plane may be performed by the SM function.

The base station 1b-20 may determine connectivity with the L-GW 1b-40 for a V2X service connected to the base station itself. When the base station 1b-20 makes S1 connection to the MME 1b-30, it may provide to the MME 1b-30 information of the L-GW 1b-40 for the V2X service connected to the base station itself or L-GW connection capability information. As the result, the base station 1b-20 and the MME 1b-30 may determine that the corresponding base station has been connected to the local network for the V2X. It is assumed that the base station 1b-20 and the L-GW 1b-40 are in a connected state through the above-described method at 1b-61.

The terminal 1b-10 attempts a connection to the base station 1b-20, and this follows a radio access procedure (e.g., a resource access channel (RACH) procedure) that is defined in the 3GPP standard, at 1b-63. Through this process, the terminal 1b-10 may notify the base station 1b-20 that the terminal is a terminal that uses the V2X service through a radio resource control (RRC) message. Through this process, the base station notifies the terminal of a V2X data path that the base station can provide. This may be contained in system information 1b-65 that the base station 1b-20 broadcasts to the terminal 1b-10. The system information may include information indicating that the path for V2X is an LTE-Uu (e.g., information such as LTE-Uu for V2X), and L-GW information (e.g., L-GW ID) for a V2X service. Further, the base station 1b-20 may notify the terminal 1b-10 that performs a radio access of an interface that can be used for V2X data transmission through the RRC message 1b-67. The RRC message may include information indicating that the path for V2X is an LTE-Uu (e.g., information such as LTE-Uu for V2X), and L-GW ID for a V2X service. The RRC message may be a response to the RRC message for the terminal 1b-10 to request resources for V2X.

As described above, a "usable V2X data path" of which the base station 1b-20 notifies the terminal 1b-10 may indicate a data path for V2V. Accordingly, the terminal 1b-10 may utilize configuration information for V2V message transmission, and may transmit data through a general LTE-Uu interface with respect to V2I or V2N. V2X data paths to be described below may mean data paths for V2V in all.

Interfaces that the base station 1b-20 can provide to the terminal 1b-10 for the V2X data transmission may be a PC5 and an LTE-Uu. The PC5 is an interface for direct communication between terminals, and the LTE-Uu is an interface for communication between the terminal and the base station. Data through such interfaces is transferred up to a data network through a mobile communication network. The base station 1b-20 may independently indicate an interface that the terminal 1b-10 can use during transmission of data for V2X. In other words, the terminal 1b-10 may use the PC5 or LTE-Uu for the purposes other than V2X, and the base station 1b-20 may configure the terminal to exclusively use the PC5 and LTE-Uu for a V2X service independently from a case where the terminal uses them for the purposes other than the V2X. Accordingly, in an embodiment of the present disclosure, the base station specifies and transfers to the terminal usage of a PC5 interface for V2X and an LTE-Uu interface for V2X. That is, the base station 1b-20 may provide path information for V2X data transmission using SIB or RRC in a radio access procedure, and in the case of providing the path information, it may indicate that the provided path is a path for the V2X service.

If the base station 1b-20 is not connected to the local network for V2X, it is unable to provide the V2X data of the terminal 1b-10 with low latency, and thus it may configure the terminal 1b-10 not to use the LTE-Uu interface for V2X. In this case, the base station 1b-20 may indicate that only PC5 is to be used as an interface for transmission of the V2X data (e.g., for V2X, PC5 only). In this case, the terminal 1b-10 recognizes that the interface that the base station 1b-20 provides for V2X is the PC5 only, is allocated with wireless resources for using the PC5 from the base station 1b-20, and transfers data through the PC5 interface if V2X data transmission is needed.

If the base station 1b-20 is connected to the V2X local network and does not operate the PC5 interface for communication with the terminal from the viewpoint of wireless resource management, the base station may indicate that the terminal 1b-10 should use only the LTE-Uu interface for V2X (e.g., for V2X, LTE-Uu only). In this case, the terminal 1b-10 recognizes that the interface that the base station 1b-20 provides for V2X is the LTE-Uu only.

The base station 1b-20 may notify the terminal 1b-10 of the name of the local network that the terminal 1b-10 can use for a V2X service through the system information 1b-65 for notifying that the terminal 1b-10 should use an LTE-Uu interface or an RRC message 1b-67. The base station 1b-20 may notify the terminal 1b-10 of L-GW information or local network information to which the base station itself is connected. This may be contained in the system information 1b-65 that the base station 1b-20 broadcasts to the terminal 1b-10, or may be included in the RRC message that the base station 1b-20 sends to the terminal 1b-10. The above-described information may be in the form of an IP address of an L-GW, an ID of an L-GW, or the name of a local network. The terminal 1b-10 has the IP address of the L-GW, the ID of the L-GW, or the name of the local network transferred from V2X server. The terminal 1b-10 that has received the information from the base station 1b-20 compares the received information with the information that the base station has, and if they coincide with each other, the terminal may determine that the corresponding base station 1b-20 is connected to the local network for V2X that the terminal 1b-10 intends to use.

Thereafter, the terminal 1b-10 may identify the local network for V2X that is provided by the base station 1b-20, and may request a PDN connection 1b-69 from the corresponding network. For this, in the case of requesting the PDN connectivity from a core network (CN) (MME), the terminal 1b-10 may include an access point name (APN) for a local V2X service or a general V2X service in the corresponding message. In the case of transferring a PDN connectivity request message that is sent by the terminal 1b-10 to the MME 1b-30, the base station 1b-20 may use an initial UE message 1b-71. In this case, the initial UE message to be transferred may include a transmission address of an L-GW for V2X that is connected to the base station itself.

The MME 1b-30 that has received the initial UE message checks that the corresponding base station 1b-20 can use the L-GW 1b-40 for V2X, grasps the transmission address through which the base station 1b-20 transmits data to the corresponding L-GW, and checks whether an APN that is requested by the terminal 1b-10 is an APN for V2X through checking of a PDN connectivity request message that is sent by the terminal 1b-10, at 1b-73. Further, the MME 1b-30 checks whether the terminal is a terminal that can use the V2X service or a terminal that can access the local network for a V2X service through checking of subscription information of the corresponding terminal 1b-10, at 1b-73.

The MME 1b-30, which has checked that local network connection for V2X is permitted through the above-described processes, sends an initial UE context setup message 1b-75 to the base station 1b-20 in order to establish a bearer for a V2X local network connection of the terminal 1b-10. This message may include quality of service (QoS) information and bearer ID for a data radio bearer (DRB) or an E-UTRAN radio access bearer (E-RAB) that should be established between the base station and the terminal, and a tunnel endpoint ID of the L-GW that will become an endpoint of the bearer. Further, the message may further include a correlation ID. Using the correlation ID, the MME 1b-30 may identify that the bearer to be established between the terminal 1b-10 and the base station 1b-20 is a bearer that is connected to the L-GW due to the information.

The base station 1b-20 that has received the initial UE context setup message may determine that the V2X local network connection for the terminal 1b-10 has been permitted in view of the correlation ID. Accordingly, the base station 1b-20 establishes a local network connection to the L-GW 1b-40 for the terminal 1b-10, which is connected from the L-GW up to the V2X application server 1b-50, at 1b-77. The V2X application server 1b-50 may be a local V2X application server that is connected to the L-GW 1b-40, or a macro V2X application server that is directly connected to the L-GW 1b-40.

The base station 1b-20, which has established the local network connection between the L-GW 1b-40 and the corresponding terminal 1b-10, performs a procedure of establishing the terminal 1b-10 and a DRB, at 1b-79.

If the base station 1b-20 is connected to the V2X local network and operates a PC5 interface for direct communication with the terminal, it may indicate that the terminal 1b-10 should use a PC5 or an LTE-Uu as a V2X data transmission interface (e.g., for V2X, PC5, or LTE-Uu).

In this case, the terminal 1b-10 should determine whether to send V2X data to be sent by the terminal itself to the PC5 or the LTE-Uu. The base station 1b-20 may notify the terminal 1b-10 of L-GW information or local network information to which the base station itself is connected. This may be contained in system information that the base station 1b-20 broadcasts to the terminal 1b-10, or may be included in the RRC message that the base station sends to the terminal. The information may be in the form of an internet protocol (IP) address of an L-GW, an ID of the L-GW, or the name of a local network. The method for using the information is as described above. Therefore, the terminal 1b-10 has the IP address of the L-GW, the ID of the L-GW, or the name of the local network transferred from V2X server. The terminal 1b-10 that has received the information from the base station 1b-20 compares the received information with the information that the base station has, and if they coincide with each other, the terminal may determine that the corresponding base station 1b-20 is connected to the local network for V2X that the terminal 1b-10 intends to use.

Thereafter, the terminal 1b-10 may identify the local network for V2X that is provided by the base station 1b-20, and may request a PDN connection from the corresponding network. For this, in the case of requesting the PDN connectivity from a CN (MME), the terminal 1b-10 may include an APN for a local V2X service or a general V2X service in the corresponding message. In the case of transferring a PDN connectivity request message that is sent by the terminal 1*b*-10 to the MME 1*b*-30, the base station 1*b*-20 may use an initial UE message. In this case, the initial UE message to be transferred may include a transmission address of an L-GW for V2X that is connected to the base station itself.

The MME 1*b*-30 that has received the initial UE message checks that the corresponding base station 1*b*-20 can use the L-GW 1*b*-40 for V2X, grasps the transmission address through which the base station 1*b*-20 transmits data to the corresponding L-GW, and checks whether an APN that is requested by the terminal 1*b*-10 is an APN for V2X through checking of a PDN connectivity request message that is sent by the terminal 1*b*-10. Further, the MME 1*b*-30 checks whether the terminal is a terminal that can use the V2X service or a terminal that can access the local network for a V2X service through checking of subscription information of the corresponding terminal 1*b*-10.

The MME 1*b*-30, which has checked that local network connection for V2X is permitted through the above-described processes, sends an initial UE context setup message to the base station 1*b*-20 in order to establish a bearer for a V2X local network connection of the terminal 1*b*-10. This message may include QoS information and bearer ID for a DRB or an E-RAB that should be established between the base station and the terminal, and a tunnel endpoint ID of the L-GW that will become an endpoint of the bearer. Further, the message may further include a correlation ID. Using the correlation ID, the MME 1*b*-30 may identify that the bearer to be established between the terminal 1*b*-10 and the base station 1*b*-20 is a bearer that is connected to the L-GW due to the information.

The base station 1*b*-20 that has received the initial UE context setup message may determine that the V2X local network connection for the terminal 1*b*-10 has been permitted in view of the correlation ID. Accordingly, the base station 1*b*-20 establishes a local network connection to the L-GW 1*b*-40 for the terminal 1*b*-10, which is connected from the L-GW up to the V2X application server 1*b*-50. The V2X application server 1*b*-50 may be a local V2X application server that is connected to the L-GW 1*b*-40, or a macro V2X application server that is directly connected to the L-GW 1*b*-40.

The base station 1*b*-20, which has established the local network connection between the L-GW 1*b*-40 and the corresponding terminal 1*b*-10, performs a procedure of establishing the terminal 1*b*-10 and a DRB.

In the detailed embodiment, if the base station has configured both PC5 and LTE-Uu to be usable as data paths for V2X or V2V, the terminal should select one of two interfaces. The selection criteria of the terminal may follow the following embodiment.

1. A physical layer of a terminal may grasp how many resource blocks are occupied through sensing of a PC5 interface. The physical layer may transfer this information to a media access control (MAC) layer, and the MAC layer may transfer this information to an upper layer that selects a data path for V2X data transmission. The terminal that has acquired PC5 interface sensing information of the physical layer may determine that many resource blocks are occupied on the PC5, and idle resource blocks are insufficient to send a V2X message or a V2V message to be sent by the terminal itself. In this case, the terminal may start message transmission through selection of an LTE-Uu interface in order to send the V2X message or the V2V message.

2. If it is necessary for a terminal to transfer a V2X or V2V message in a situation where there is not a V2X local network to which the terminal itself is currently connected, the terminal selects a PC5 interface to transmit a message.

3. A terminal may determine that there are many V2X or V2V messages that the terminal itself receives through the PC5. For example, if several V2X or V2V messages are received at an instance when a PC5 channel is once monitored, the terminal may determine that the PC5 channel is congested. In this case, the terminal starts V2X or V2V message transmission through selection of the LTE-Uu.

Embodiment 1-2

Figure 1C:
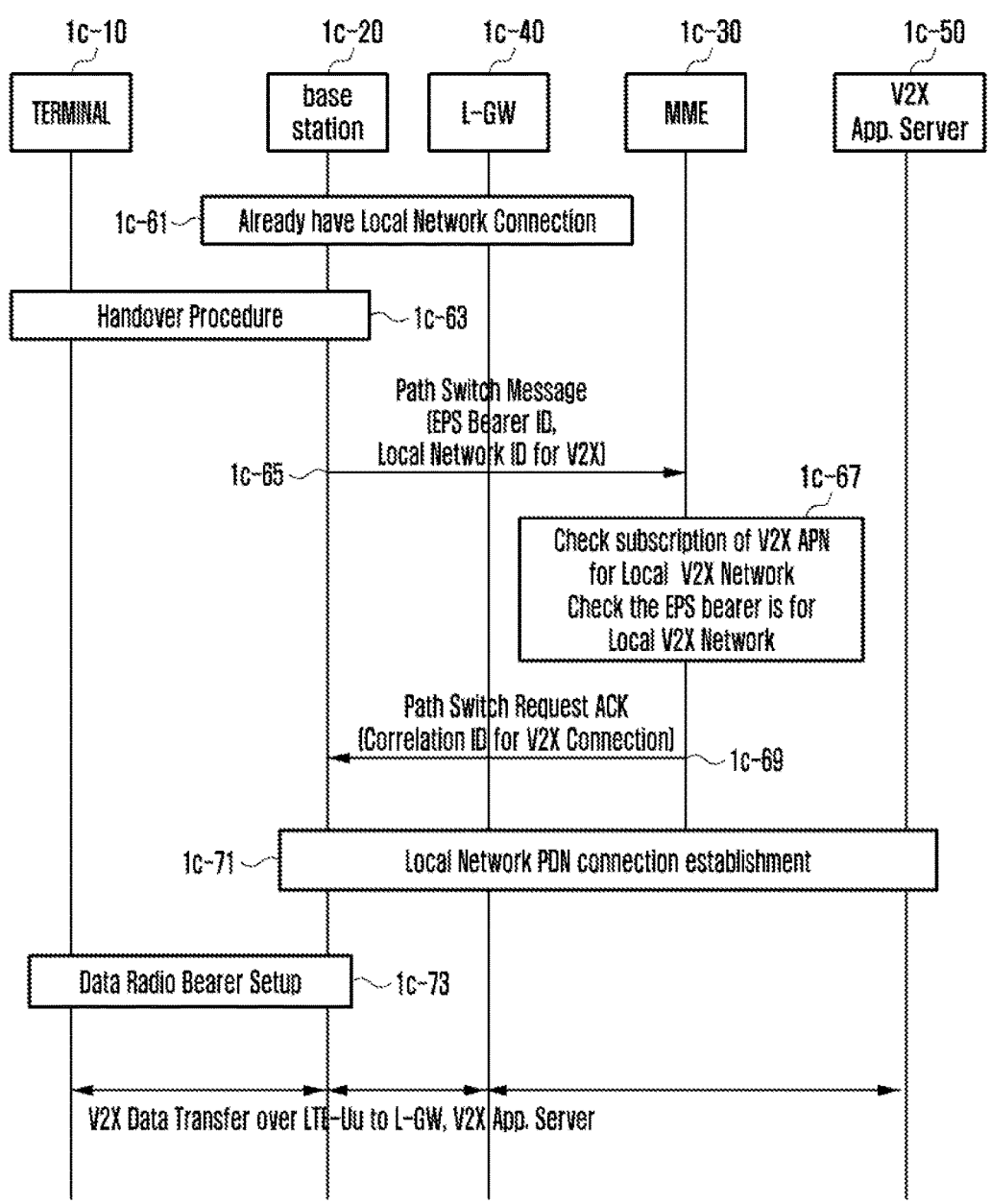
FIG. 1C is a diagram illustrating a procedure of maintaining connectivity of a local network through a handover procedure between base stations if several base stations are connected to one local network according to an embodiment of the present disclosure.

FIG. 1C is a diagram illustrating a procedure of maintaining connectivity of a local network through a handover procedure between base stations if several base stations are connected to one local network according to an embodiment of the present disclosure.

Referring to FIG. 1C, a system according to an embodiment of the present disclosure may include a terminal 1*c*-10, a base station 1*c*-20, an MME 1*c*-30, an L-GW 1*c*-40, and a V2X application server 1*c*-50. The MME 1*c*-30 may be called a control function, and the control function may include an MM function and an SM function. The application server may be a V2X application server. In the following embodiment, for convenience in explanation, the term "MME" is used, but the term and concept "control function" may be used instead of the MME. In the case of applying the control function, management of a control plane may be performed by the MM function, and management of a user plane may be performed by the SM function.

Embodiment 1-2 refers to a method for a network to provide a continuous local network connection to the terminal if the terminal 1*c*-10, which is connected to a V2X local network to transmit and receive data, is handed over to an adjacent base station 1*c*-20. This embodiment is based on the system structure illustrated in FIG. 1A.

Referring again to the structure of FIG. 1A, a V2X local network is deployed in a specific area, several base stations are connected to the local network, and a terminal moves between the base stations. That is, the base stations may be connected to one L-GW, or the base stations that are connected to different L-GWs are connected to one V2X local network, that is, several L-GWs are connected to one local V2X application server.

The existing L-GW connection does not support handover. That is, in the case of seceding from the range of a base station, a bearer that is connected to the L-GW should be released to be reestablished. However, embodiment 1-2 of the present disclosure proposes a method for supporting handover in a situation where several base stations are connected to one L-GW.

Referring to FIG. 1C, the terminal 1*c*-10 is connected to a V2X local network through a previous base station to transmit V2X data to the L-GW that is connected to the corresponding base station. It is assumed that the base station 1*c*-20 is connected to the L-GW 1*c*-40, at 1*c*-61. The terminal 1*c*-10 has been instructed by the previous base station to perform handover due to its location change or deteriorated coverage state, and thus the terminal has performed a handover procedure through wireless connection to the base station 1*c*-20, at 1*c*-63.

It is assumed that the two base stations have already known as base stations that are connected to the L-GW 1*c*-40. Accordingly, it may be notified that there has been a bearer connected to the L-GW 1*c*-40 through signaling between the base stations during the handover.

The base station 1c-20 that has checked a wireless connection of the terminal 1c-10 may transmit a message 1c-65 notifying that the base station serves the terminal 1c-10 through the MME 1c-30. For example, the base station 1c-20 may notify the MME 1c-30 that the corresponding terminal 1c-10 is serviced by the base station itself through sending of a path switch request. In this case, the base station 1c-20 may notify the MME 1c-30 of an evolved packet system (EPS) bearer ID that is handed over to the terminal, and may also notify the MME 1c-30 that this bearer is a bearer that is connected to the L-GW. Further, the base station 1c-20 may notify the MME 1c-30 of an ID of a V2X local network to which the base station 1c-20 is connected. Further, the base station 1c-20 may notify the MME 1c-30 of packet data network (PDN) session information or protocol data unit (PDU) session information.

The MME 1c-30 that has received this may grasp that the base station 1c-20 is connected to the V2X local network. This can be known through the ID of the local network that is sent by the base station 1c-20 or an identifier that indicates connection to the L-GW 1c-40. The MME 1c-30 determines whether the corresponding terminal has a connection authority to the V2X local network that is currently connected to the base station through determination of subscription information of the terminal handed over 1c-10, at 1c-67. Further, the MME may see an EPS bearer ID that is being used by the terminal, and may know whether the corresponding bearer is a bearer that is connected to the V2X local network and whether the base station can currently support this through checking of a message (e.g., path switch request) that is sent by the base station 1c-20. Further, the MME may check whether the bearer is connected to the V2X local network using PDN session information or PDU session information, and whether the base station can currently support this.

Thereafter, the MME 1c-30 may transmit a message that includes the checking result of 1c-67 to the base station 1c-20. For example, the MME 1c-30 may transmit an ACK for the path switch request to the base station 1c-20. The MME 1c-30 may configure the address of the L-GW to which the base station 1c-20 is connected with a correlation ID in the message, and may include the correlation ID in the corresponding ACK message 1c-69 to be transmitted. The correlation ID may be in the form of a tunneling endpoint ID for the L-GW 1c-40 of the V2X local network to which the base station is connected. The MME 1c-30 may determine whether the corresponding terminal 1c-10 is attached to the same local network with the correlation ID. This information may be used later to check whether the terminal is attached to the V2X local network, or whether the bearer is connected to the V2X local network, even during the handover occurrence.

The base station 1c-20 that has received the ACK to the path switch request from the MME 1c-30 determines what L-GW 1c-40 it is connected to through seeing of the correlation ID that is included in the message. Further, the base station 1c-20 may perform a connection to the L-GW 1c-40 after determining whether the correlation ID that is included in the message is identical to a TEID of the L-GW 1c-40 to which the base station itself is connected. The base station 1c-20 notifies the L-GW 1c-40 that a path has been changed from the previous base station to the base station itself, and the L-GW 1c-40 establishes a tunneling connection from the corresponding previous base station to the current base station through the use of the same correlation ID, at 1c-71.

If the bearer information or the session information is changed after the connection to the L-GW 1c-40 is completed, the base station 1c-20 re-performs a DRB setup procedure, at 1c-73. Further, the base station 1c-20 completes the handover procedure through transferring of information on the bearer through which the connection to the L-GW 1c-40 is completed to the terminal 1c-10. Thereafter, the terminal may transmit the V2X message or the V2V message through the V2X local network.

In the above-described method according to an embodiment of the present disclosure, if the terminal 1c-10 performs handover between base stations that are connected to the L-GW 1c-40, the bearer or session of the L-GW 1c-40 that is configured with respect to the terminal 1c-10 is not released, but only the bearer or session between the base station 1c-20 and the terminal 1c-10 can be reconfigured to use the V2X service.

Figure 1D:
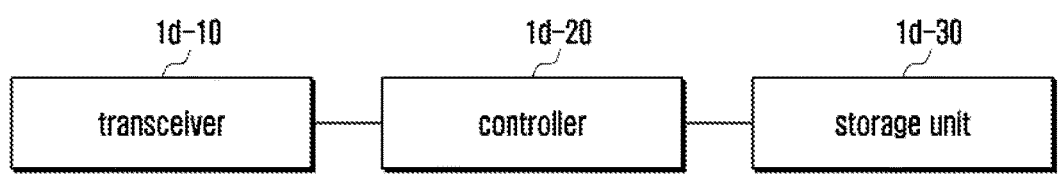
FIG. 1D is a diagram illustrating the structure of a terminal according to an embodiment of the present disclosure.

FIG. 1D is a diagram illustrating the structure of a terminal according to an embodiment of the present disclosure.

Referring to FIG. 1D, a terminal may include a transceiver unit 1d-10, a controller 1d-20, and a storage unit 1d-30. The controller according to the present disclosure may be defined as a circuit, an application specific integrated circuit, or at least one processor.

The transceiver unit 1d-10 may transmit and receive signals with another network entity. The transceiver unit 1d-10 may transmit and receive signals under the control of the controller 1d-20.

The controller 1d-20 may control the whole operation of the terminal according to an embodiment proposed in the present disclosure. The controller 1d-20 may control the operation of the terminal according to the first embodiment of the present disclosure. For example, the controller 1d-20 may control the operation of the terminal as described above with reference to FIGS. 1A to 1C.

The storage unit 1d-30 may store therein at least one of information that is transmitted and received through the transceiver unit 1d-10 and information that is generated through the controller 1d-20. Further, the storage unit 1d-30 may store therein information and codes for operating the controller 1d-20.

Figure 1E:
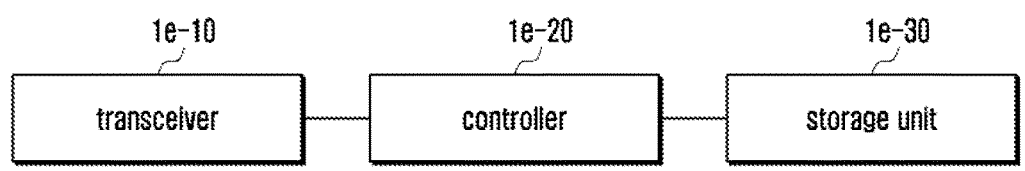
FIG. 1E is a diagram illustrating the structure of a base station according to an embodiment of the present disclosure.

FIG. 1E is a diagram illustrating the structure of a base station according to an embodiment of the present disclosure.

Referring to FIG. 1E, a base station may include a transceiver unit 1e-10, a controller 1e-20, and a storage unit 1e-30. The controller according to the present disclosure may be defined as a circuit, an application specific integrated circuit, or at least one processor.

The transceiver unit 1e-10 may transmit and receive signals with another network entity. The transceiver unit 1e-10 may transmit and receive signals under the control of the controller 1e-20.

The controller 1e-20 may control the whole operation of the base station according to an embodiment proposed in the present disclosure. The controller 1e-20 may control the operation of the base station according to the first embodiment of the present disclosure. For example, the controller 1e-20 may control the operation of the base station as described above with reference to FIGS. 1A to 1C.

The storage unit 1e-30 may store therein at least one of information that is transmitted and received through the transceiver unit 1e-10 and information that is generated through the controller 1e-20. Further, the storage unit 1e-30 may store therein information and codes for operating the controller 1e-20.

Figure 1F:
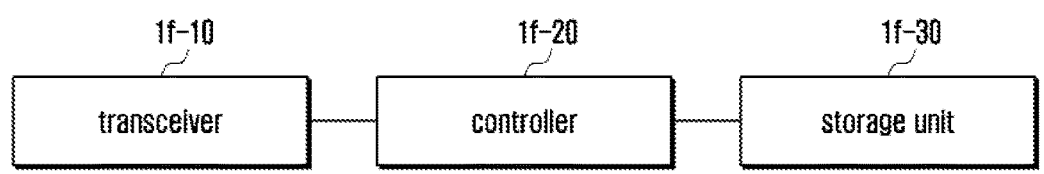
FIG. 1F is a diagram illustrating the structure of a control function according to an embodiment of the present disclosure.

FIG. 1F is a diagram illustrating the structure of an MME according to an embodiment of the present disclosure. The structure of an MME may be applied to the structure of a control function. The control function may include an SM function and an MM function, and each function may include a transceiver unit and a controller.

Referring to FIG. 1F, the MME may include a transceiver unit 1*f*-10, a controller 1*f*-20, and a storage unit 1*f*-30. The controller according to the present disclosure may be defined as a circuit, an application specific integrated circuit, or at least one processor.

The transceiver unit 1*f*-10 may transmit and receive signals with another network entity. The transceiver unit 1*f*-10 may transmit and receive signals under the control of the controller 1*f*-20.

The controller 1*f*-20 may control the whole operation of the MME according to an embodiment proposed in the present disclosure. The controller 1*f*-20 may control the operation of the MME or a control function according to the first embodiment of the present disclosure. For example, the controller 1*f*-20 may control the operation of the MME or the control function as described above with reference to FIGS. 1A to 1C.

The storage unit 1*f*-30 may store therein at least one of information that is transmitted and received through the transceiver unit 1*f*-10 and information that is generated through the controller 1*f*-20. Further, the storage unit 1*f*-30 may store therein information and codes for operating the controller 1*f*-20.

Figure 1G:
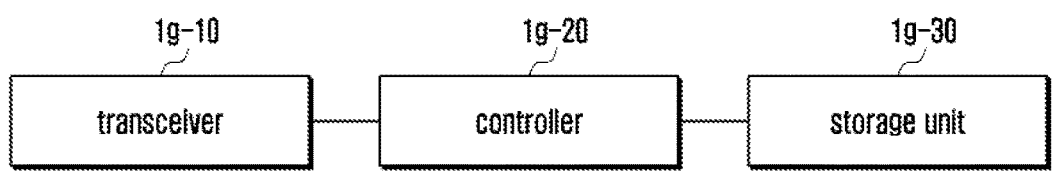
FIG. 1G is a diagram illustrating the structure of a local gateway according to an embodiment of the present disclosure.

FIG. 1G is a diagram illustrating the structure of an L-GW according to an embodiment of the present disclosure.

Referring to FIG. 1G, the L-GW may include a transceiver unit 1*g*-10, a controller 1*g*-20, and a storage unit 1*g*-30. The controller according to the present disclosure may be defined as a circuit, an application specific integrated circuit, or at least one processor.

The transceiver unit 1*g*-10 may transmit and receive signals with another network entity. The transceiver unit 1*g*-10 may transmit and receive signals under the control of the controller 1*g*-20.

The controller 1*g*-20 may control the whole operation of the L-GW according to an embodiment proposed in the present disclosure. The controller 1*g*-20 may control the operation of the L-GW according to the first embodiment of the present disclosure. For example, the controller 1*g*-20 may control the operation of the L-GW as described above with reference to FIGS. 1A to 1C.

The storage unit 1*g*-30 may store therein at least one of information that is transmitted and received through the transceiver unit 1*g*-10 and information that is generated through the controller 1*g*-20. Further, the storage unit 1*g*-30 may store therein information and codes for operating the controller 1*g*-20.

Second Embodiment

Figure 2A:
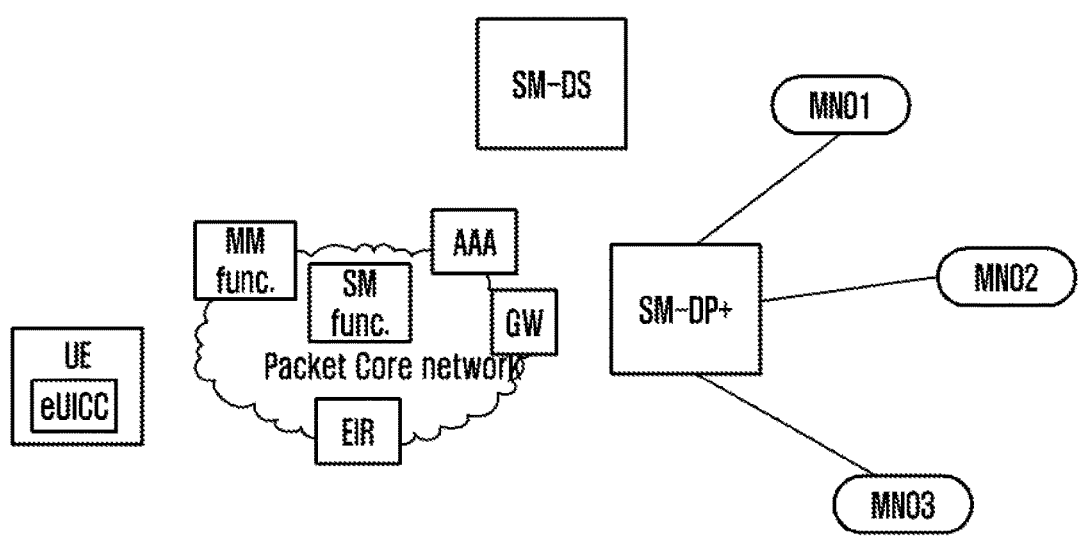
FIG. 2A is a diagram illustrating the structure of a network in which a terminal that is mounted with an embedded subscriber identification module (eSIM) performs subscriber identification module (SIM) profile provisioning according to an embodiment of the present disclosure.

FIG. 2A is a diagram illustrating the structure of a network in which a terminal that is mounted with an embedded subscriber identification module (eSIM) performs subscriber identification module (SIM) profile provisioning according to an embodiment of the present disclosure.

Referring to FIG. 2A, a terminal (or UE) is mounted with an embedded universal integrated circulated card (eUICC) in order to use an eSIM. After the terminal secures connectivity through connection to a packet CN, the eUICC receives provisioning of a SIM profile that corresponds to a mobile network operator (MNO) that will use a data service from an eSIM server (e.g., subscription manager data preparation plus (SM-DP+) server). If the terminal or the eUICC does not have an address of an SM-DP+ server, the terminal receives provisioning of the SIM profile through connection to the SM-DP+ server after acquiring the address of a suitable SM-DP+ server through connection to an SM-DS server that is one other eSIM server.

The packet CN to which the terminal connects to secure the connectivity may be, for example, a cellular network that provides data communication, and may be, for example, an EPS that provides an LTE network service or a 5G network. There may be an MM functional entity that takes charge of MM of the terminal and an SM functional entity that takes charge of SM, and through the functional entities, signaling messages may be processed. In the case of an EPS, an MME serves as the MM functional entity and the SM functional entity. Further, an equipment identity register (EIR) is an entity that determines whether the terminal is a permitted terminal through an IMEI of the terminal in a network, and in the present disclosure, the EIR is defined as an entity that can determine whether the eUICC is a permitted eUICC with respect to an eUICC ID. As an authentication server for encrypted communication with the terminal or the eUICC, for example, there is an authentication, authorization, and access (AAA) server, and if encryption is not performed in the process of connecting to the packet CN, the AAA server is not used. Although not illustrated in FIG. 1B, the system may include a base station, and through the base station, the terminal and the MM or the terminal and the MME may transmit and receive signals, information, data, and messages.

Figures 2, 2B:
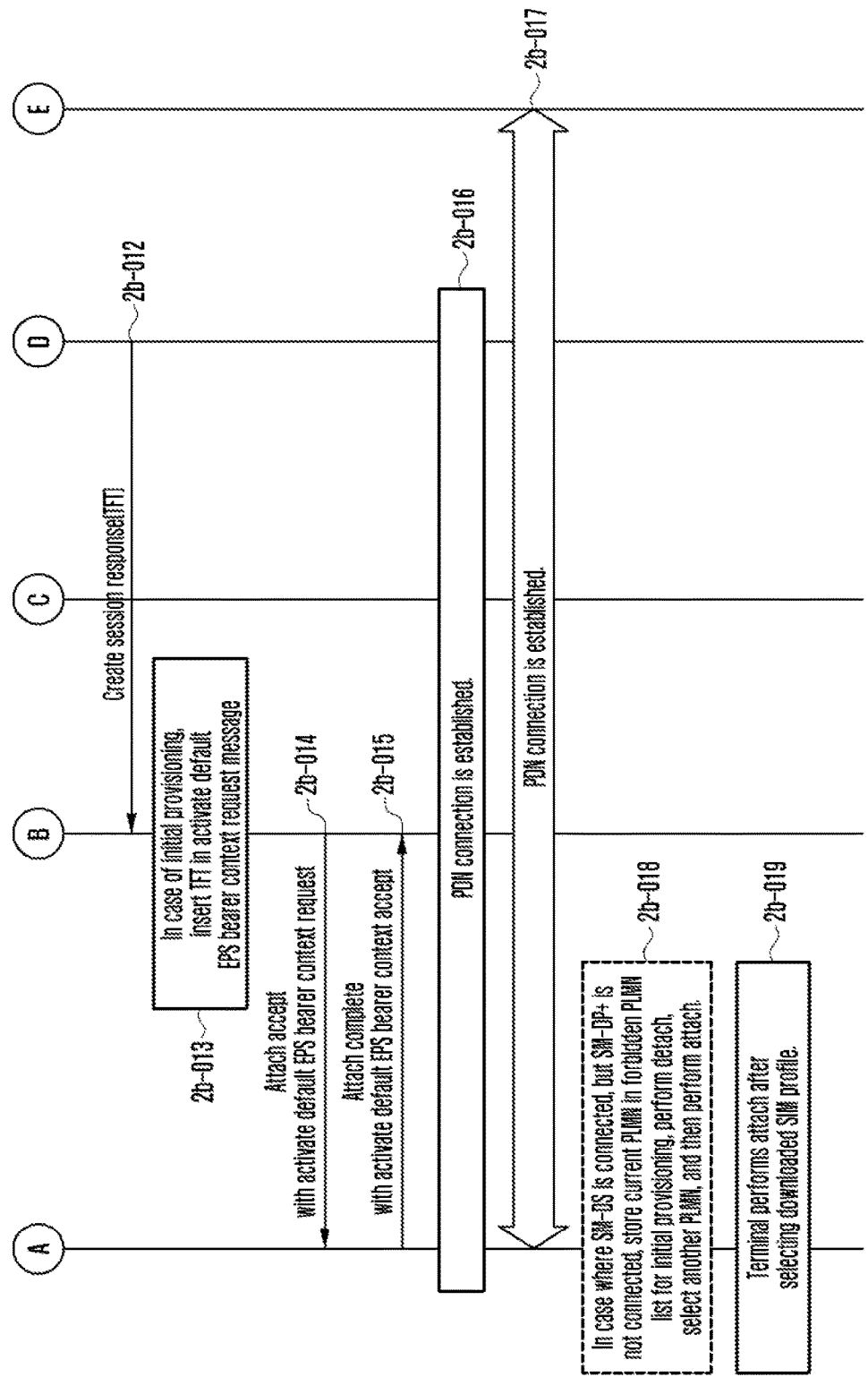
Figures 1, 2C:
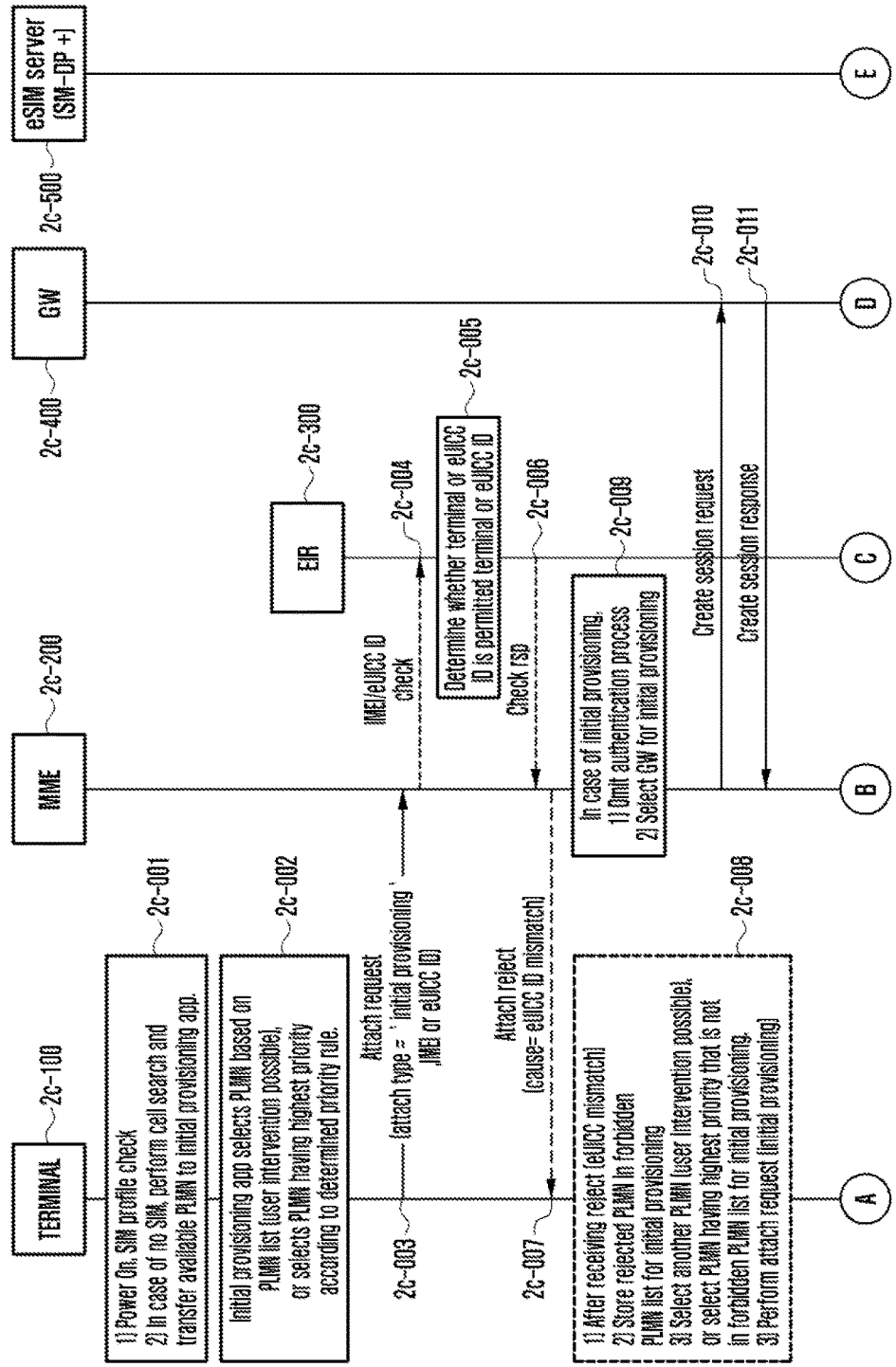
Figures 2, 2C:
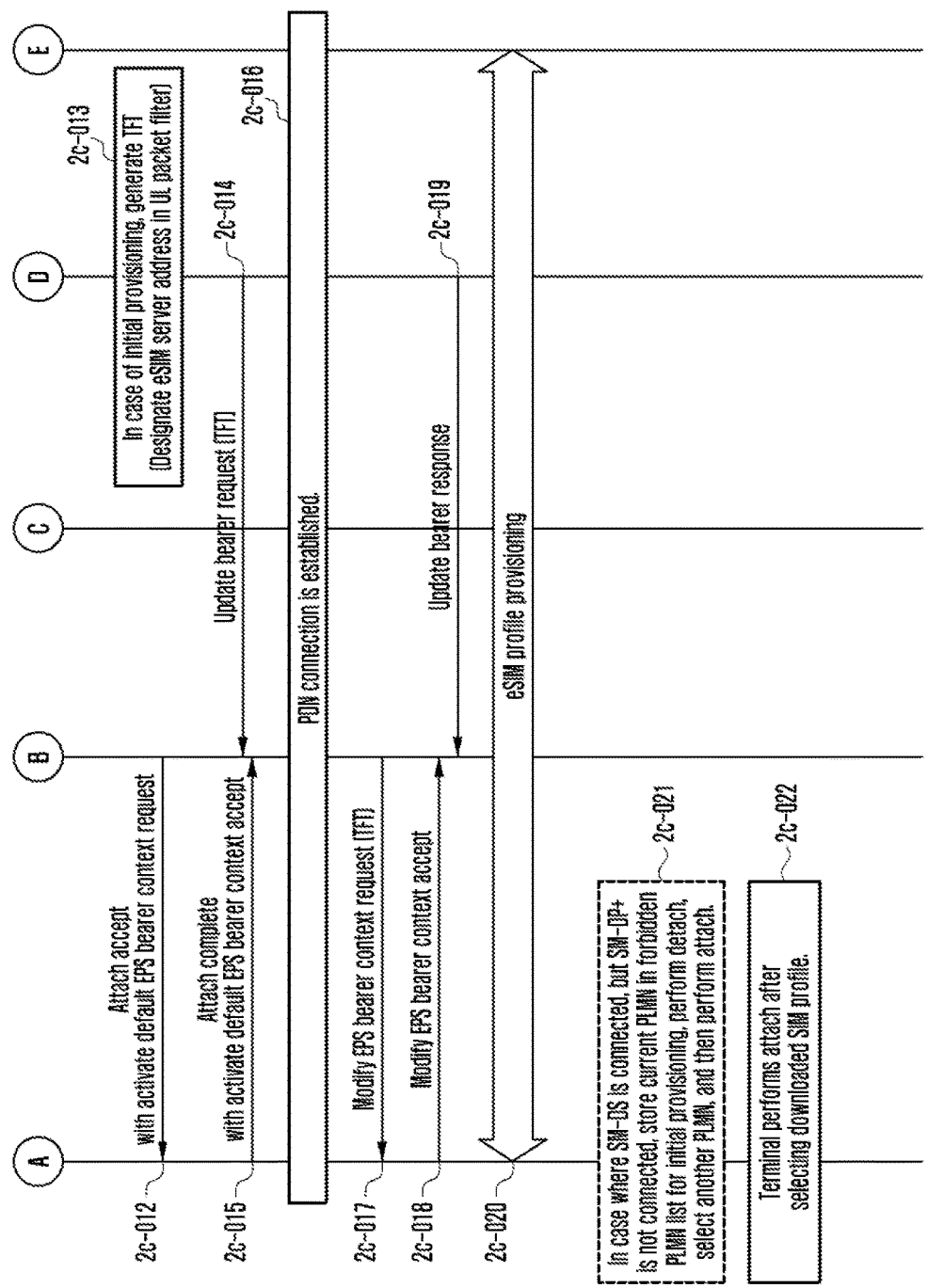

FIGS. 2B-1 and 2B-2 are diagrams illustrating network connection schemes for a terminal that is mounted with an eSIM to perform initial provisioning according to various embodiments of the present disclosure. Hereinafter, FIGS. 2B-1 and 2B-2 are commonly called FIG. 2B.

Referring to FIGS. 2B-1 and 2B-2, in an embodiment of the present disclosure, a process is illustrated, in which connectivity is acquired through connection to a cellular network, provisioning of a SIM profile is received through an eSIM server, and connection to the network is performed using the downloaded SIM profile.

In a turn-on state, a terminal 2*b*-100 checks a SIM profile, and if there is not the SIM profile, the terminal recognizes the necessity of initial provisioning and transfers a list of available public land mobile networks (PLMNs) to an application of the terminal or an entity that takes charge of the initial provisioning on the basis of a list of PLMNs that are sensed through a cell search, at 2*b*-001.

The terminal 2*b*-100 may select a PLMN to be connected to for the initial provisioning on the basis of the transferred PLMN list, at 2*b*-002. The selection of the PLMNs may be performed through a user's selection input or in accordance with the priority order according to a specific priority rule in the terminal. For example, in the case of a smart phone that facilitates the user's input, an initial provisioning app presents a list of PLMNs that can be selected through a UI, and a user may select a PLMN through which the user desires to receive the provisioning. As another method, if it is difficult to make the user's input, for example, if a communication network service provider to be used is determined later after an internet of things (IoT) service provider purchases an IoT-oriented terminal, and thus there is no information on the communication network service provider in the terminal, a PLMN that corresponds to the highest priority may be selected in accordance with the priority rule of the terminal itself, such as selection of a PLMN having the highest signal strength among available PLMNs.

The terminal 2b-100 requests a network connection through the PLMN that is selected in the above-described process while transmitting an attach request to an MME 2b-200. In this case, through an attach request message, it can be known that an attach type is for the initial provisioning, at 2b-003. For example, "attach type=initial provisioning" may be used. In this case, the attach request message may include an identity of the terminal 2b-100, for example, both or one of an international mobile equipment identity (IMEI) or an eUICC identity (e.g., eUICC ID or eID). Further, the attach request message may include both or one of an address of an SM-DS server and an address of an SM-DP+ server to be connected to the terminal.

The MME 2b-200 transmits a request message to an EIR 2b-300 in order to determine whether the terminal that has sent the attach request is a terminal that is permitted in the corresponding PLMN, or whether the eUICC that is used by the terminal is a permitted eUICC. The request message may include at least one of an IMEI and an eUICC ID, and may request checking of whether the ID is permitted with respect to each identifier or both identifiers, at 2b-004.

The EIR 2b-300 checks whether the terminal or the eUICC is a connection-permitted terminal or a connection-permitted eUICC on the basis of information that is received from the MME 2b-200, at 2b-005. The EIR 2b-300 may determine whether to permit the IMEI or eUICC ID in a manner that network connection is rejected if a transmitted ID is in a blacklist of IMEIs or eUICC IDs that are managed to prevent inferiority or robbery that is managed in the corresponding service provider network or to prevent online opening. As another method, network connection is permitted only in the case where a transmitted ID is included in a white list of IMEIs or EUICC IDs of terminals, of which the online opening can be specially permitted by the corresponding service provider. In the case where a terminal manufacturer that has manufactured IoT terminals provides information on IMEI or eUICC ID to an IoT service provider without providing network opening to the IoT service provider, and IoT service providers make a contract to use a network of a communication network service provider later, information on the IMEI or eUICC ID that is received from the terminal manufacturer is transferred to the communication network service provider. The communication network service provider may store the white list in the EIR 2b-300 on the basis of the transferred information, and may permit an attach only with respect to the terminal of the IMEI or eUICC ID to be subscribed through checking whether the IMEI, eUICC ID, or both of them are permitted IDs through the EIR with respect to all the terminals that have sent an attach request for the initial provisioning.

The EIR 2b-300 may transmit to the MME 2b-200 information that indicates whether connection of the terminal 2b-100 or eUICC is permitted, at 2b-006.

If the information that is received from the EIR 2b-300 indicates that the connection is not permitted, the MME 2b-200 may send an attach reject message to the terminal 2b-100 to reject the network connection, at 2b-007. In this case, the rejection cause that is included in the reject message may include eUICC ID mismatch in the PLMN, IMEI mismatch in the PLMN, eUICC ID is not available in the PLMN, and IMEI is not available in the PLMN.

In the case of receiving the attach reject message, the terminal 2b-100 may store the ID of the corresponding PLMN in a forbidden PLMN list for initial provisioning, and may re-select the PLMN among available PLMNs, at 2b-008. In this case, the PLMN that is included in the forbidden PLMN list for initial provisioning is excluded from the available PLMN list. The selection of the PLMN is performed in the same manner as 2b-002, and the terminal 2b-100 performs again an attach request process for the initial provisioning.

On the other hand, if the EIR 2b-300 notifies the MME 2b-200 that the connection of the terminal 2b-100 has been permitted, the MME 2b-200 omits an authentication/authorization process for security, and selects a GW for the initial provisioning, at 2b-009. That is, in an embodiment of the present disclosure, since the attach process is an attach process for provisioning, it is newly proposed for the MME 2b-200 to omit the authentication/authorization process. At 2b-003, the terminal 2b-100 may piggyback a PDN connectivity request on an attach request message, and even if the PDN connectivity request is not transferred together in the case where the access type of the attach request message is for the initial provisioning, the MME 2b-200 selects a gateway (GW) 2b-400 for performing the initial provisioning, and transfers a create session request to the GW 2b-400 to request the GW to make the PDN connection, at 2b-010. In this case, if the GW for the initial provisioning is not designated to be used as a separate entity in the network, the create session request includes an indication capable of notifying of the initial provisioning. Further, the create session request may include an address of an SM-DS server that is received from the terminal 2b-100 or an address of an SM-DP+ server.

On the other hand, if it is recognized that the create session request is for the initial provisioning, the GW 2b-400 that has received the create session request may allocate an IP address, and may operate to generate a default EPS bearer context. In this case, the GW generates a traffic flow template (TFT) in the default EPS bearer so that the terminal 2b-100 can use the same only for the purpose of traffic for the initial provisioning, and it configures an uplink/downlink packet filter so that the communication becomes possible only in the case where the address of the eSIM server (e.g., SM-DP+ server or SM-DS server) is included as a destination/source IP address, at 2b-011. In the process of configuring the uplink/downlink packet filter, an IP address to be used for specific filtering may be determined on the basis of the address of the SM-DS server or the address of the SM-DP+ server that is received from the terminal 2b-100, or the address that is serviced by the terminal 2b-100 may be used for authorization.

The GW 2b-400 may transmit a create session response message to the MME 2b-200. The create session response message may include the TFT that includes the uplink/downlink packet filter for the default EPS bearer, at 2b-012.

The MME 2b-200 may include the received TFT in an activate default EPS bearer context request message, at 2b-013. The MME 2b-200 may transfer the activate default EPS bearer context request message to the terminal 2b-100 together with an attach accept message, at 2b-014.

The terminal 2b-100 may transfer an attach complete message to the MME 2b-200, and at this time, it may transfer an active default EPS bearer context accept message together, at 2b-015. Thereafter, the terminal 2b-100 may establish a PDN connection to the GW 2b-400, at 2b-016.

Thereafter, the terminal 2b-100 may attach to an eSIM server 2b-500 using the acquired connectivity to receive provisioning of a SIM profile, at 2b-017. If an SM-DS address exists in a packet filter that is configured in the TFT, but an SM-DP+ address is omitted to cause the SIM profile provisioning to be unsuccessfully performed in the process of attaching to the eSIM server, the terminal adds an ID of the currently attached PLMN to a forbidden PLMN list for initial provisioning, and then performs detach and attach request processes in order, at 2b-018. If the provisioning of the SIM profile is successfully performed, the terminal 2b-100 performs a normal attach process using the downloaded SIM profile to use a data service, at 2b-019.

FIGS. 2C-1 and 2C-2 are diagrams illustrating network connection schemes for a terminal that is mounted with an eSIM to perform initial provisioning according to various embodiments of the present disclosure. Hereinafter, FIGS. 2C-1 and 2C-2 are commonly called FIG. 2C.

Referring to FIGS. 2C-1 and 2C-2, in an embodiment of the present disclosure, a process is illustrated, in which connectivity is acquired through connection to a cellular network, provisioning of a SIM profile is received through an eSIM server, and connection to the network is performed using the downloaded SIM profile. The technology illustrated in FIGS. 2C-1 and 2C-2 is similar to the technology illustrated in FIGS. 2B-1 and 2B-2 except for the procedure in which a GW installs a packet filter in a default EPS bearer.

In a turn-on state, a terminal 2c-100 checks a SIM profile, and if there is not the SIM profile, the terminal recognizes the necessity of initial provisioning and transfers a list of available PLMNs to an application of the terminal or an entity that takes charge of the initial provisioning on the basis of a list of PLMNs that are sensed through a cell search, at 2c-001.

The terminal 2c-100 may select a PLMN to be connected to for the initial provisioning on the basis of the transferred PLMN list, at 2c-002. The selection of the PLMNs may be performed through a user's selection input or in accordance with the priority order according to a specific priority rule in the terminal. For example, in the case of a smart phone that facilitates the user's input, an initial provisioning app presents a list of PLMNs that can be selected through a UI, and a user may select a PLMN through which the user desires to receive the provisioning. As another method, if it is difficult to make the user's input, for example, if a communication network service provider to be used is determined later after an IoT service provider purchases an IoT-oriented terminal, and thus there is no information on the communication network service provider in the terminal, a PLMN that corresponds to the highest priority may be selected in accordance with the priority rule of the terminal itself, such as selection of a PLMN having the highest signal strength among available PLMNs.

The terminal 2c-100 requests a network connection through the PLMN that is selected in the above-described process while transmitting an attach request to an MME 2c-200. In this case, through an attach request message, it can be known that an attach type is for the initial provisioning, at 2c-003. For example, "attach type=initial provisioning" may be used. In this case, the attach request message may include an identity of the terminal, for example, both or one of an IMEI or an eUICC identity (e.g., eUICC IDs). Further, the attach request message may include both or one of an address of an SM-DS server and an address of an SM-DP+ server to be connected to the terminal.

The MME 2c-200 transmits a request message to an EIR 2c-300 in order to determine whether the terminal 2c-100 that has sent the attach request is a terminal that is permitted in the corresponding PLMN, or whether the eUICC that is used by the terminal 2c-100 is a permitted eUICC. The request message may include at least one of an IMEI and an eUICC ID, and may request checking of whether the ID is permitted with respect to each identifier or both identifiers, at 2c-004.

The EIR 2c-300 checks whether the terminal or the eUICC is a connection-permitted terminal or a connection-permitted eUICC on the basis of information that is received from the MME 2c-200, at 2c-005. The EIR 2c-300 may determine whether to permit the IMEI or eUICC ID in a manner that network connection is rejected if a transmitted ID is in a blacklist of IMEIs or eUICC IDs that are managed to prevent inferiority or robbery that is managed in the corresponding service provider network or to prevent online opening. As another method, network connection is permitted only in the case where a transmitted ID is included in a white list of IMEIs or eUICC IDs of terminals, of which the online opening can be specially permitted by the corresponding service provider. In the case where a terminal manufacturer that has manufactured IoT terminals provides information on IMEI or eUICC ID to an IoT service provider without providing network opening to the IoT service provider, and IoT service providers make a contract to use a network of a communication network service provider later, information on the IMEI or eUICC ID that is received from the terminal manufacturer is transferred to the communication network service provider. The communication network service provider may store the white list in the EIR 2c-300 on the basis of the transferred information, and may permit an attach only with respect to the terminal of the IMEI or eUICC ID to be subscribed through checking whether the IMEI, eUICC ID, or both of them are permitted IDs through the EIR with respect to all the terminals that have sent an attach request for the initial provisioning.

The EIR 2c-300 may transmit to the MME 2c-200 information that indicates whether connection of the terminal 2c-100 or eUICC is permitted, at 2c-006.

If the information that is received from the EIR 2c-300 indicates that the connection is not permitted, the MME 2c-200 may send an attach reject message to the terminal 2c-100 to reject the network connection, at 2c-007. In this case, the rejection cause that is included in the reject message may include eUICC ID mismatch in the PLMN, IMEI mismatch in the PLMN, eUICC ID is not available in the PLMN, and IMEI is not available in the PLMN.

In the case of receiving the attach reject message, the terminal 2c-100 may store the ID of the corresponding PLMN in a forbidden PLMN list for initial provisioning, and may re-select the PLMN among available PLMNs, at 2c-008. In this case, the PLMN that is included in the forbidden PLMN list for initial provisioning is excluded from the available PLMN list. The selection of the PLMN is performed in the same manner as 2c-002, and the terminal 2c-100 performs again an attach request process for the initial provisioning.

On the other hand, if the EIR 2c-300 notifies the MME 2c-200 that the connection of the terminal 2c-100 has been permitted, the MME 2c-200 omits an authentication/authorization process for security, and selects a GW for the initial provisioning, at 2c-009. That is, in an embodiment of the present disclosure, since the attach process is an attach process for provisioning, it is newly proposed for the MME 2c-200 to omit the authentication/authorization process. At 2c-003, the terminal 2c-100 may piggyback a PDN connectivity request on an attach request message, and even if the PDN connectivity request is not transferred together in the case where the access type of the attach request message is for the initial provisioning, the MME 2c-200 selects a GW 2c-400 for performing the initial provisioning, and transfers a create session request to the GW 2c-400 to request the GW to make the PDN connection, at 2c-010. In this case, if the GW for the initial provisioning is not designated to be used as a separate entity in the network, the create session request includes an indication capable of notifying of the initial provisioning. Further, the create session request may include an address of an SM-DS server that is received from the terminal 2c-100 or an address of an SM-DP+ server.

On the other hand, if it is recognized that the create session request is for the initial provisioning, the GW 2c-400 that has received the create session request may allocate an IP address, operate to generate a default EPS bearer context, and send a create session response to the MME 2c-200, at 2c-011. If the create session response is received, the MME 2c-200 may send an attach accept message to the terminal 2c-100, at 2c-012, and at this time, the MME 2c-200 may also transmit an activate default EPS bearer context request together. Detailed contents thereof have been described with reference to FIG. 2B.

The GW 2c-400, after or just after the create session response is transmitted, generates a TFT in the default EPS bearer so that the terminal 2c-100 can use the same only for the purpose of traffic for the initial provisioning, and it configures an uplink/downlink packet filter so that the communication becomes possible only in the case where the address of the eSIM server (e.g., SM-DP+ server or SM-DS server) is included as a destination/source IP address, at 2c-013.

In the process of configuring the uplink/downlink packet filter, an IP address to be used for specific filtering may be determined on the basis of the address of the SM-DS server or the address of the SM-DP+ server that is received from the terminal 2c-100, or the address that is serviced by the terminal 2c-100 may be used for authorization.

The GW 2c-400 may include the TFT in an update bearer request to be sent to the MME so as to apply the TFT that includes the uplink/downlink packet filter for the default EPS bearer as described above, at 2c-014.

On the other hand, the MME 2c-200 that has received the create session response message may transmit an activate default EPS bearer context request to the terminal 2c-100 together with the attach accept message. The terminal 2c-100 may transfer an attach complete message to the MME 2c-200, and at this time, it may transfer an active default EPS bearer context accept message together, at 2c-015. Thereafter, the terminal 2c-100 may establish a PDN connection to the GW 2c-400, at 2c-016.

Further, at 2c-014, the MME 2c-200 that has received the update bearer request applies to the default EPS bearer the TFT that includes the packet filter that limits the use of traffic only for the initial provisioning through EPS bearer modification, and notifies the GW 2c-400 of the result through the update bearer response message. That is, the MME 2c-200 transmits a modify EPS bearer context request message to the terminal 2c-100, at 2c-017. The terminal 2c-100 transmits a modify EPS bearer context accept message to the MME 2c-200, at 2c-018. Thereafter, the MME 2c-200 transmits an update bearer response message to the GW 2c-400, at 2c-019.

Thereafter, the terminal may attach to an eSIM server 2c-500 using the acquired connectivity to receive provisioning of a SIM profile, at 2c-020. If an SM-DS address exists in a packet filter that is configured in the TFT, but an SM-DP+ address is omitted to cause the SIM profile provisioning to be unsuccessfully performed in the process of attaching to the eSIM server 2c-500, the terminal 2c-100 adds an ID of the currently attached PLMN to a forbidden PLMN list for initial provisioning, and then performs detach and attach request processes in order, at 2c-021. If the provisioning of the SIM profile is successfully performed, the terminal 2c-100 may perform a normal attach process using the downloaded SIM profile to use a data service, at 2c-022.

Figures 1, 2D:
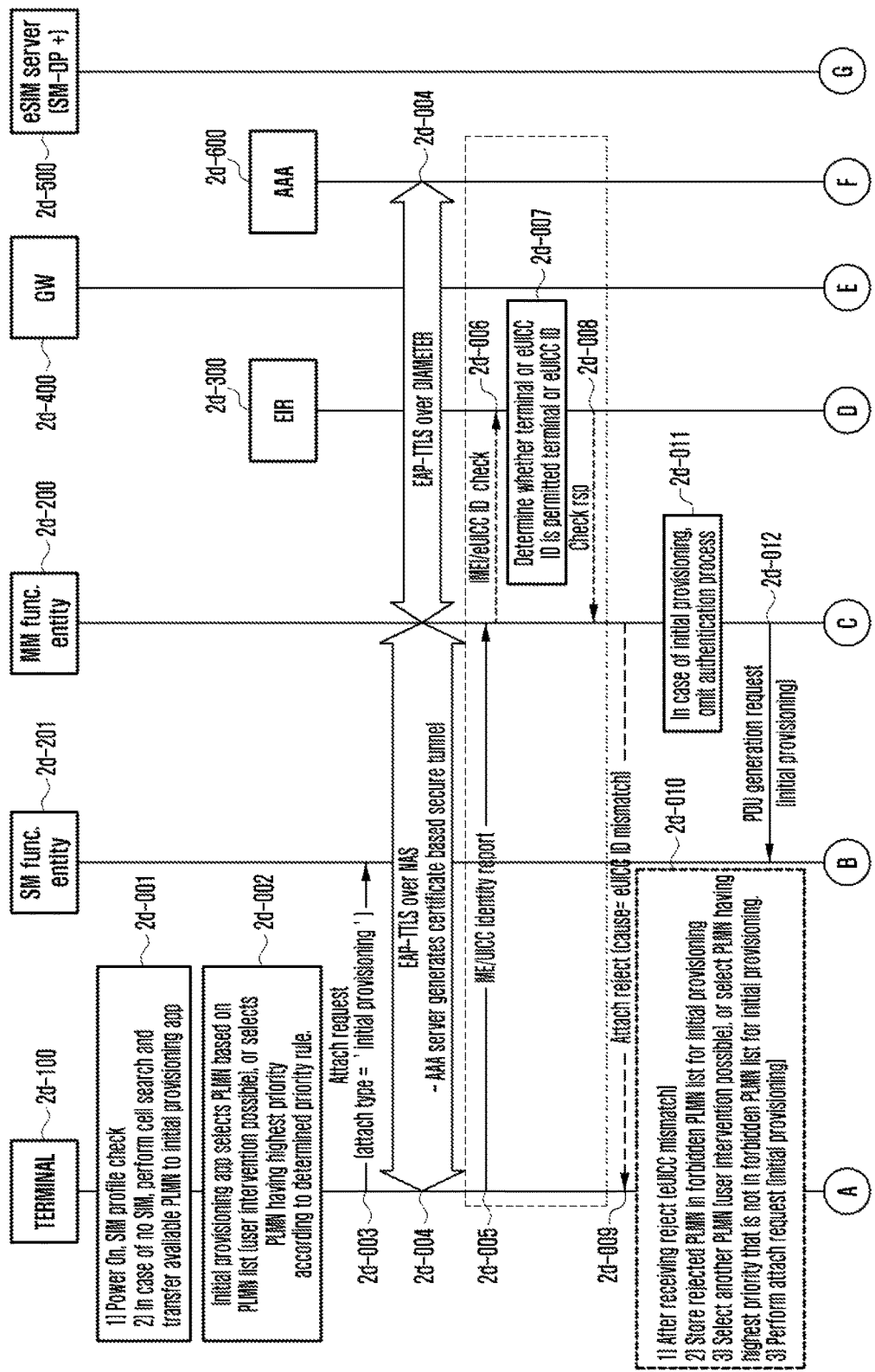

FIGS. 2D-1 and 2D-2 are diagrams illustrating network connection schemes for a terminal that is mounted with an eSIM to perform initial provisioning in consideration of an ID security according to various embodiments of the present disclosure. Hereinafter, FIGS. 2D-1 and 2D-2 are commonly called FIG. 2D.

Referring to FIGS. 2D-1 and 2D-2, in an embodiment of the present disclosure, a process is illustrated, in which connectivity is acquired through connection to a cellular network, provisioning of a SIM profile is received through an eSIM server, and connection to the network is performed using the downloaded SIM profile. In particular, this embodiment includes a method for encrypting information, such as IMEI or eUICC ID.

In a turn-on state, a terminal 2d-100 checks a SIM profile, and if there is not the SIM profile, the terminal recognizes the necessity of initial provisioning and transfers a list of available PLMNs to an application of the terminal or an entity that takes charge of the initial provisioning on the basis of a list of PLMNs that are sensed through a cell search, at 2d-001.

The terminal 2d-100 may select a PLMN to be connected to for the initial provisioning on the basis of the transferred PLMN list, at 2d-002. The selection of the PLMNs may be performed through a user's selection input or in accordance with the priority order according to a specific priority rule in the terminal. For example, in the case of a smart phone that facilitates the user's input, an initial provisioning app presents a list of PLMNs that can be selected through a UI, and a user may select a PLMN through which the user desires to receive the provisioning. As another method, if it is difficult to make the user's input, for example, if a communication network service provider to be used is determined later after an IoT service provider purchases an IoT-oriented terminal, and thus there is no information on the communication network service provider in the terminal, a PLMN that corresponds to the highest priority may be selected in accordance with the priority rule of the terminal itself, such as selection of a PLMN having the highest signal strength among available PLMNs.

The terminal 2d-100 requests a network connection through the PLMN that is selected in the above-described process while transmitting an attach request to an MM functional entity 2d-200. In this case, through an attach request message, it can be known that an attach type is for the initial provisioning, at 2d-003. For example, "attach type=initial provisioning" may be used.

The MM functional entity 2d-200 that has received the attach request triggers an extensible authentication protocol (EAP) process, and the terminal 2d-100 authenticates an AAA server 2d-600 on the basis of an AAA server certificate through EAP-TLS or EAP-TTLS between the terminal 2d-100 and the AAA server 2d-600 of a network, and generates a secure tunnel on the basis of an encryption key that is created in the authentication process, at 2d-004.

If the secure tunnel is generated, the terminal 2d-100 transmits an IMEI, an eUICC ID, or both of them to the MM functional entity 2d-200, at 2d-005. Again, the MM functional entity 2d-200 determines whether the transmitted ID is a permitted ID through sending the IMEI, eUICC ID, or both of them to an EIR 2d-300, at 2d-006.

Further, the terminal 2d-100 may send to the MM functional entity 2d-200 including both or one of an address of an SM-DS server and an address of an SM-DP+ server to be connected to the terminal 2d-100.

As another embodiment, processes of 2d-005, 2d-006, 2d-007, and 2d-008 may be replaced by a method in which the terminal transfers the IMEI, eUICC ID, or both IDs to the AAA server through an EAP message at 2d-004, and the AAA server determines whether the transferred ID is a permitted ID through sending of the IMEI, eUICC ID, or both IDs to the EIR.

The EIR 2d-300 checks whether the terminal or the eUICC is a connection-permitted terminal or a connection-permitted eUICC on the basis of information that is received from the MM functional entity 2d-200, at 2d-007.

The EIR may determine whether to permit the IMEI or eUICC ID in a manner that network connection is rejected if the transmitted ID is in a blacklist of IMEIs or eUICC IDs that are managed to prevent inferiority or robbery that is managed in the corresponding service provider network or to prevent online opening. As another method, network connection is permitted only in the case where a transmitted ID is included in a white list of IMEIs or eUICC IDs of terminals, of which the online opening can be specially permitted by the corresponding service provider. In the case where a terminal manufacturer that has manufactured IoT terminals provides information on IMEI or eUICC ID to an IoT service provider without providing network opening to the IoT service provider, and IoT service providers make a contract to use a network of a communication network service provider later, information on the IMEI or eUICC ID that is received from the terminal manufacturer is transferred to the communication network service provider. The communication network service provider may store the white list in the EIR 2d-300 on the basis of the transferred information, and may permit an attach only with respect to the terminal of the IMEI or eUICC ID to be subscribed through checking whether the IMEI, eUICC ID, or both of them are permitted IDs through the EIR with respect to all the terminals that have sent an attach request for the initial provisioning.

The EIR 2d-300 may transmit to the MM functional entity 2d-200 information that indicates whether connection of the terminal 2d-100 or eUICC is permitted, at 2d-008.

If the information that is received from the EIR 2d-300 indicates that the connection is not permitted, the MM functional entity 2d-200 may send an attach reject message to the terminal 2d-100 to reject the network connection, at 2d-009. In this case, the rejection cause that is included in the reject message may include eUICC ID mismatch in the PLMN, IMEI mismatch in the PLMN, eUICC ID is not available in the PLMN, and IMEI is not available in the PLMN.

In the case of receiving the attach reject message, the terminal 2d-100 may store the ID of the corresponding PLMN in a forbidden PLMN list for initial provisioning, and may select the PLMN among available PLMNs, at 2d-010. In this case, the PLMN that is included in the forbidden PLMN list for initial provisioning is excluded from the available PLMN list. The selection of the PLMN is performed in the same method as 2d-002, and the terminal 2d-100 performs again an attach request process for the initial provisioning.

On the other hand, if the EIR 2d-300 notifies the MM functional entity 2d-200 of the connection permission, the MM functional entity 2d-200 omits an authentication/authorization process for security, at 2d-011, and requests an SM functional entity 2d-201 to generate a PDU session for initial provisioning, at 2d-012. That is, in an embodiment of the present disclosure, since the attach process is an attach process for provisioning, it is newly proposed for the MM functional entity 2d-200 to omit the authentication/authorization process. At 2d-003, the terminal 2d-100 may piggyback a PDN connectivity request on an attach request message, and even if the PDN connectivity request is not transferred together in the case where the access type of the attach request message is for the initial provisioning, the MM functional entity 2d-200 may request the SM functional entity 2d-201 to generate the PDU session for performing the initial provisioning. In this case, a PDU generation request message may include an address of an SM-DS server that is received from the terminal 2d-100 or an address of an SM-DP+ server.

The SM functional entity 2d-201 that has received the PDU generation request selects a GW 2d-400 for the initial provisioning, at 2d-013, and transfers a create session request to the GW 2d-400 to request the GW to make the PDU connection, at 2d-014. In this case, if the GW for the initial provisioning is not designated to be used as a separate entity in the network, the create session request includes an indication capable of notifying of the initial provisioning.

Further, the create session request may include an address of an SM-DS server that is received from the terminal 2d-100 or an address of an SM-DP+ server.

On the other hand, if it is recognized that the create session request is for the initial provisioning, the GW 2d-400 that has received the create session request may allocate an IP address, and may operate to generate a default bearer context. In this case, the GW generates a TFT in the default bearer so that the terminal 2d-100 can use the same only for the purpose of traffic for the initial provisioning, and it configures an uplink/downlink packet filter so that the communication becomes possible only in the case where the address of the eSIM server (e.g., SM-DP+ server or SM-DS server) is included as a destination/source IP address, at 2d-015.

In the process of configuring the uplink/downlink packet filter, an IP address to be used for specific filtering may be determined on the basis of the address of the SM-DS server or the address of the SM-DP+ server that is received from the terminal 2d-100, or the address that is serviced by the terminal 2d-100 may be used for authorization.

If the GW 2d-400 has sent the TFT that includes the uplink/downlink packet filter for the default bearer to the SM functional entity 2d-201 as described above, at 2d-016, the SM functional entity 2d-201 may configure the PDU connection through messaging for bearer setup between the MM functional entity 2d-200 and the terminal 2d-100, and in the process, the TFT information is transferred to the terminal, at 2d-017.

Further, as another embodiment, the GW 2d-400 does not transfer the TFT that is generated at 2d-015 to the terminal 2d-100 through 2d-016 and 2d-017, but may transfer to the terminal 2d-100 the TFT that limits the use of traffic only for the initial provisioning through a process of updating the default bearer through the bearer update request, at 2d-018, 2d-019, and 2d-020.

Thereafter, the terminal may attach to an eSIM server 2d-500 using the acquired connectivity to receive provisioning of a SIM profile, at 2d-021. If an SM-DS address exists in a packet filter that is configured in the TFT, but an SM-DP+ address is omitted to cause the SIM profile provisioning to be unsuccessfully performed in the process of attaching to the eSIM server 2d-500, the terminal 2d-100 adds an ID of the currently attached PLMN to a forbidden PLMN list for initial provisioning, and then performs detach and attach request processes in order, at 2d-022. If the provisioning of the SIM profile is successfully performed, the terminal 2d-100 may perform a normal attach process using the downloaded SIM profile to use a data service, at 2d-023.

Figure 2E:
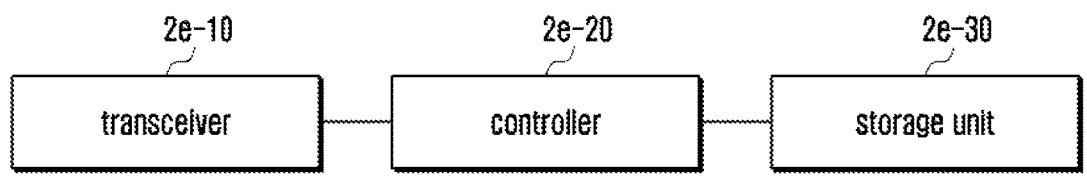
FIG. 2E is a diagram illustrating the structure of a terminal according to an embodiment of the present disclosure.

FIG. 2E is a diagram illustrating the structure of a terminal according to an embodiment of the present disclosure.

Referring to FIG. 2E, a terminal may include a transceiver unit 2e-10, a controller 2e-20, and a storage unit 2e-30. The controller according to the present disclosure may be defined as a circuit, an application specific integrated circuit, or at least one processor.

The transceiver unit 2e-10 may transmit and receive signals with another network entity. The transceiver unit 2e-10 may transmit and receive signals under the control of the controller 2e-20.

The controller 2e-20 may control the whole operation of the terminal according to an embodiment proposed in the present disclosure. The controller 2e-20 may control the operation of the terminal according to the second embodiment of the present disclosure. For example, the controller 2e-20 may control the operation of the terminal as described above with reference to FIGS. 2A to 2D.

The storage unit 2e-30 may store therein at least one of information that is transmitted and received through the transceiver unit 2e-10 and information that is generated through the controller 2e-20. Further, the storage unit 2e-30 may store therein information and codes for operating the controller 2e-20.

Figure 2F:
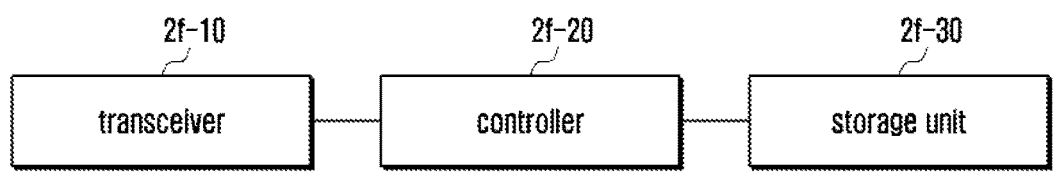
FIG. 2F is a diagram illustrating the structure of a mobility management entity (MME) according to an embodiment of the present disclosure.

FIG. 2F is a diagram illustrating the structure of an MME according to an embodiment of the present disclosure. The structure of an MME may be applied to the structure of a control function if it is applied to a NR system. The control function may include an SM function entity and an MM function entity, and each function may include a transceiver unit and a controller.

Referring to FIG. 2F, the MME may include a transceiver unit 2f-10, a controller 2f-20, and a storage unit 2f-30. The controller according to the present disclosure may be defined as a circuit, an application specific integrated circuit, or at least one processor.

The transceiver unit 2f-10 may transmit and receive signals with another network entity. The transceiver unit 2f-10 may transmit and receive signals under the control of the controller 2f-20.

The controller 2f-20 may control the whole operation of the MME according to an embodiment proposed in the present disclosure. The controller 2f-20 may control the operation of the MME or a control function according to the second embodiment of the present disclosure. For example, the controller 2f-20 may control the operation of the MME or the control function as described above with reference to FIGS. 2A to 2D.

The storage unit 2f-30 may store therein at least one of information that is transmitted and received through the transceiver unit 2f-10 and information that is generated through the controller 2f-20. Further, the storage unit 2f-30 may store therein information and codes for operating the controller 2f-20.

Figure 2G:
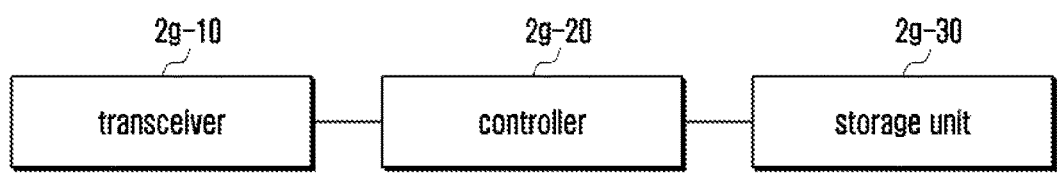
FIG. 2G is a diagram illustrating the structure of a gateway according to an embodiment of the present disclosure.

FIG. 2G is a diagram illustrating the structure of a GW according to an embodiment of the present disclosure.

Referring to FIG. 2G, the GW may include a transceiver unit 2g-10, a controller 2g-20, and a storage unit 2g-30. The controller according to the present disclosure may be defined as a circuit, an application specific integrated circuit, or at least one processor.

The transceiver unit 2g-10 may transmit and receive signals with another network entity. The transceiver unit 2g-10 may transmit and receive signals under the control of the controller 2g-20.

The controller 2g-20 may control the whole operation of the GW according to an embodiment proposed in the present disclosure. The controller 2g-20 may control the operation of the GW according to the second embodiment of the present disclosure. For example, the controller 2g-20 may control the operation of the GW as described above with reference to FIGS. 2A to 2D.

The storage unit 2g-30 may store therein at least one of information that is transmitted and received through the transceiver unit 2g-10 and information that is generated through the controller 2g-20. Further, the storage unit 2g-30 may store therein information and codes for operating the controller 2g-20.

Third Embodiment

Hereinafter, the operation principle according to a third embodiment of the present disclosure will be described in detail with reference to the accompanying drawings. In describing the present disclosure below, related well-known functions or configurations incorporated herein are not described in detail in the case where it is determined that they obscure the subject matter of the present disclosure in unnecessary detail. Further, terms to be described later are terms defined in consideration of their functions in the present disclosure, but may differ depending on intentions of a user and an operator or customs. Accordingly, they should be defined on the basis of the contents of the whole description of the present disclosure.

Hereinafter, terms for identifying connection nodes used in the description, terms calling network entities, terms calling messages, terms calling interfaces between network entities, and terms calling various kinds of identification information are exemplified for convenience in explanation. Accordingly, the present disclosure is not limited by the terms to be described later, and other terms that call objects having the equivalent technical meanings may be used.

Hereinafter, for convenience in explanation, terms and titles that are defined in the 3GPP LTE standards are used in the present disclosure. However, the present disclosure is not limited by such terms and titles, and they may be equally applied to systems that follow different standards.

Figure 3A:
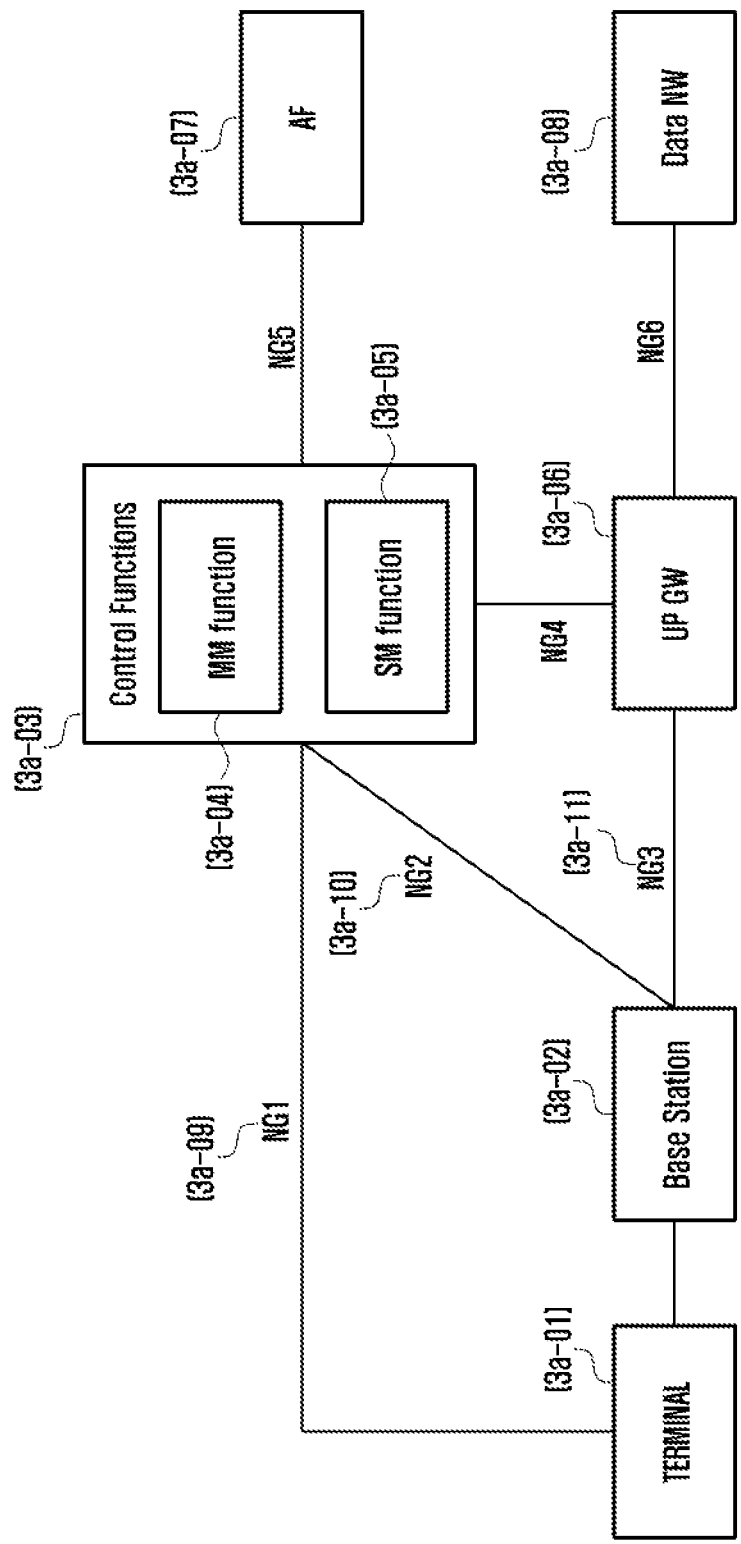
FIG. 3A is a diagram illustrating an example of a network structure of a wireless communication system according to an embodiment of the present disclosure.

FIG. 3A is a diagram illustrating an example of a network structure of a wireless communication system according to an embodiment of the present disclosure.

Referring to FIG. 3A, a wireless communication system includes a terminal 3a-01, a base station 3a-02, control functions 3a-03 including an MM 3a-04 and an SM 3a-05, and a UP GW 3a-06. In the wireless communication system, a set of devices which includes the control functions and the UP GW, but excludes the terminal and the base station is called a core network (CN).

For interworking with external applications, the wireless communication system proceeds with communication with an Application Function (AF) 3a-07, and receives service data associated with services from an outside through a data NW 3a-08.

The base station 3a-02 provides wireless connection to terminals. That is, the base station 3a-02 schedules and allocates wireless resources to serve users' traffic and supports connections between the terminals and the CN.

The MM 3a-04 performs MM function of the terminal, and is connected to the base station to transfer a control signal that is related to the MM to the terminal.

The SM 3a-05 manages session in which the terminal can perform services through the data NW, and manages transmission of service data for the terminal through a connection to the UP GW 3a-06.

The UP GW 3a-06 processes packets that have come from the base station 3a-02 or packets to be transferred to the base station 3a-02.

A connection that is configured by the control functions 3a-03 to send and receive a control signal with the terminal 3a-01 is called a connection to an NG1 3a-09.

A connection that is configured by the control functions 3a-03 to send and receive a control signal with the base station 3a-02 is called a connection to an NG2 3a-10. Packets that the terminal 3a-01 sends and receives with the control functions 3a-03 through the connection to the NG1 3a-09 are transferred between the terminal 3a-01 and the base station 3a-02 through the wireless connection, and are also transferred between the base station and the control functions through the connection to the NG2 3a-10.

A connection through which the UP GW 3a-06 sends and receives packets with the base station 3a-02 in order to send and receive the packets with the terminal is called a connection to an NG3 3a-11.

Figure 3B:
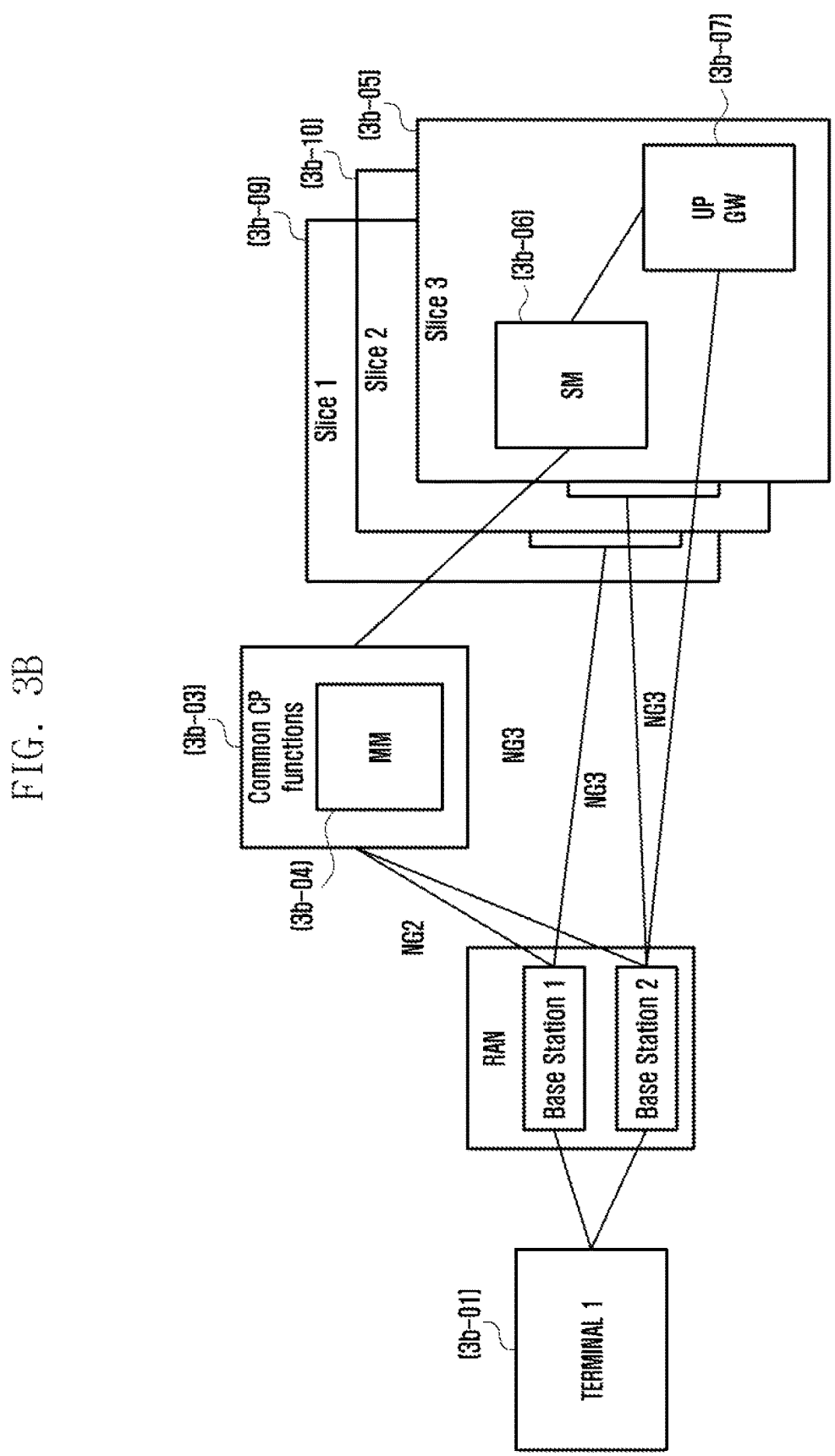
FIG. 3B is a diagram illustrating an example of a network structure of a wireless communication system to which network slices are applied according to an embodiment of the present disclosure.

FIG. 3B is a diagram illustrating an example of a network structure of a wireless communication system to which network slices are applied according to an embodiment of the present disclosure. Functions of respective entities that correspond to FIG. 3A have been described with reference to FIG. 3A.

Referring to FIG. 3B, the wireless communication system may have a separate SM 3b-06 and a separate UP GW 3b-07 for each slice. Even in the case where a terminal 3b-01 transmits and receives service data through several slices 3b-05, 3b-10, and 3b-09 mobility related management can be received through a common MM 3b-04 that belongs to common CP functions 3b-03. That is, the MM 3b-04 may control a plurality of SMs and a plurality of UP GWs.

The slices as illustrated in FIG. 3B may be differently allocated by services that the terminal can receive through the wireless communication system. For example, slice 1 3b-09 of FIG. 3B may be allocated for Internet service, slice 2 3b-10 may be allocated for an emergency network service, and slice 3 3b-05 may be allocated for a communication service for a vehicle. Each slice is serviced through the SM and the UP GW that are allocated for each slice. For example, slice 3 3b-05 may provide a communication service to the terminal 3b-01 through the SM 3b-06 and the UP GW 3b-07.

In an embodiment of the present disclosure, the slice may correspond to a PDU session. The PDU session may correspond to the relationship between the terminal and a data network. Different data according to different services may be transmitted from different PDU sessions. Accordingly, each slice may correspond to each PDU session, and a different PDU session may correspond to a different slice.

Hereinafter, in an embodiment of the present disclosure, for convenience in explanation, slices are divided. However, the concept of dividing slices may be applied as the concept of dividing PDU sessions, and the concept of providing or using identification information of slices may be applied as the concept of providing or using identification information of PDU sessions. In an embodiment of the present disclosure, a session may mean a PDU session.

Figure 3C:
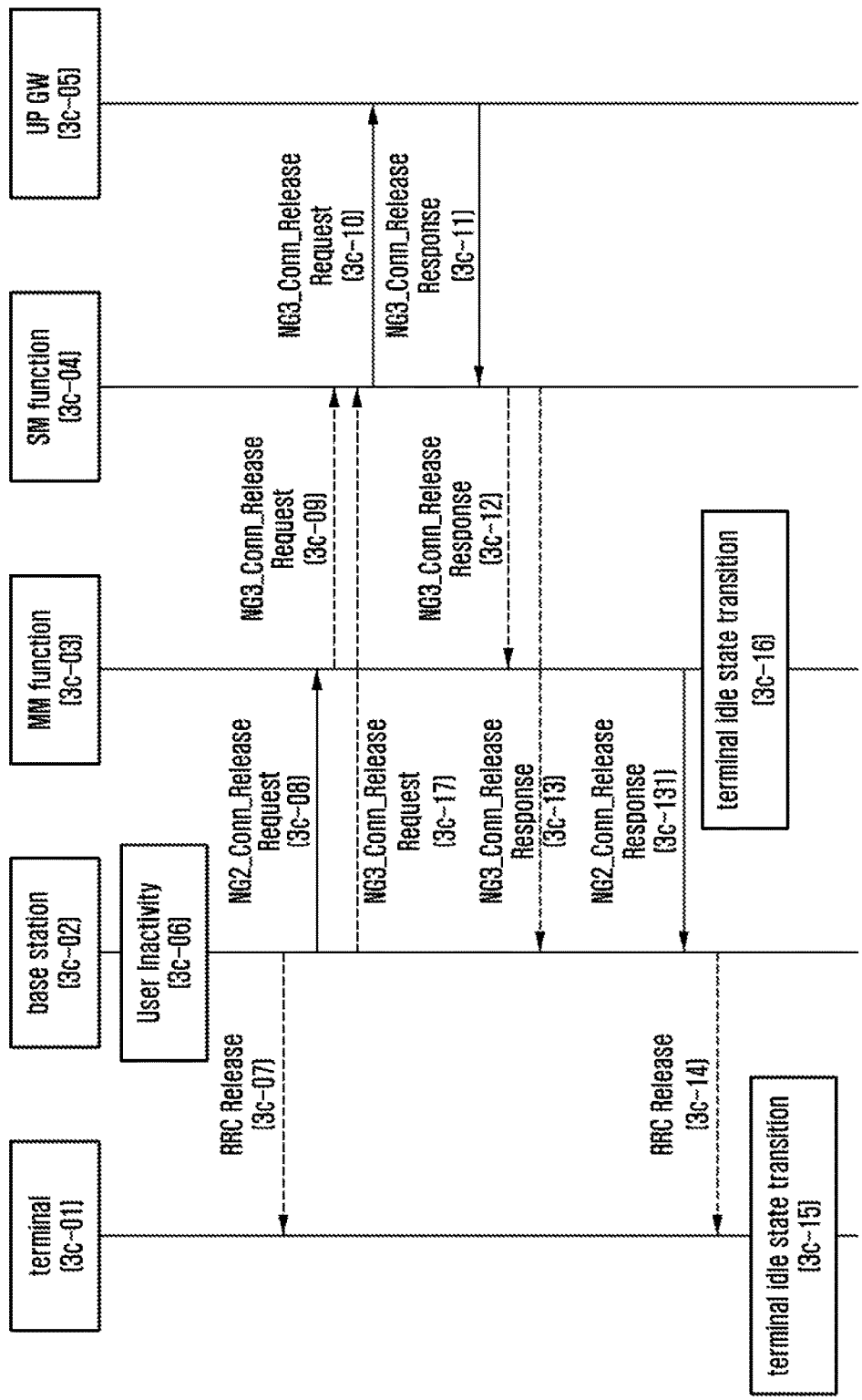
FIG. 3C is a diagram illustrating an idle state entrance procedure of a terminal in a wireless communication system according to an embodiment of the present disclosure.

FIG. 3C exemplifies a procedure in which if a terminal 3c-01 does not send and receive packets with a base station 3c-02 for a predetermined time in a wireless communication system, connections related to the terminal 3c-01 are released, and a mobility state of the terminal 3c-01 is changed to an idle state according to an embodiment of the present disclosure.

Referring to FIG. 3C, the base station 3c-02 may sense that there is no packet communication through the terminal 3c-01 for a predetermined time, at 3c-06. The base station 3c-02 may transmit an RRC release for releasing wireless resources to the terminal 3c-01, at 3c-07.

In another embodiment of the present disclosure, at 3c-07, an RRC release message is not transmitted. Thereafter, the base station 3c-02 may transmit the RRC release 3c-14 to the terminal 3c-01 after receiving an NG2_Conn_Release Response 3c-131 or an NG3_Conn_Release Response 3c-13 from an MM function 3c-03 and an SM function 3c-04.

The terminal 3c-01 that has received the RRC release (i.e., at 3c-07 or 3c-14) checks that wireless resources with the base station 3c-02 are released, and performs idle state transition, at 3c-15.

The base station 3c-02 transmits to the MM function 3c-03 an NG2_Connection_Release_Request 3c-08 for releasing NG2 connection between the base station and the MM function through an inactivity (i.e., at 3c-06) of the terminal.

The MM function 3c-03 receives the NG2_Connection_Release_Request 3c-08 from the base station 3c-02, and then transmits an NG3_Conn_Release Request 3c-09 to the SM function 3c-04 that manages the session for the terminal 3c-01 so as to release the NG3 connection between the base station 3c-02 and the UP GW 3c-05.

As another embodiment of the present disclosure, the base station 3c-02 may transmit an NG3_Conn_Release Request 3c-17. The base station 3c-02 may transmit the NG3_Conn_Release Request 3c-17 in a state where the NG3_Conn_Release Request 3c-17 is included in the NG2_Conn_Release Request 3c-08 message, or may transmit the same as a separate message. Further, the base station 3c-02 may transmit the NG3_Conn_Release Request 3c-17 so as to transfer the same to the SM function 3c-04 through the MM function 3c-03, or may transmit the same so as to directly transfer the same to the SM function 3c-04 without passing through the MM function 3c-03. The MM function 3c-03 may not transmit the NG3_Conn_Release Request 3c-09, or the NG3_Conn_Release Request 3c-17 may be directly transmitted to the SM function 3c-04 without passing through the MM function 3c-03. In this case, if the MM function 3c-03 receives the NG2_Conn_Release Request 3c-17 from the base station 3c-02, it may transmit the NG2_Conn_Release Response 3c-131 to the base station 3c-02, and may release the NG2 connection.

If the SM function 3c-04 receives the NG3_Conn_Release Request 3c-09 or the NG3_Conn_Release Request 3c-17 from the base station 3c-02 or the MM function 3c-03, it transmits the NG3_Conn_Release Request 3c-10 to the UP GW 3c-05 to request the release of the NG3 connection to the base station 3c-02 for the terminal 3c-01.

After receiving the NG3_Conn_Release Request 3c-10, the UP GW 3c-05 releases the NG3 connection to the base station 3c-02, and transmits to the SM function 3c-04 an NG3_Conn_Release Response 3c-11 that notifies the SM function that the NG3 connection has been released.

Thereafter, the UP GW 3c-05 does not transmit packets to be transmitted to the terminal 3c-01 to the base station 3c-02.

If the SM function 3c-04 receives the NG3_Conn_Release Response 3c-11 from the UP GW 3c-05, it transmits the NG3_Conn_Release Response 3c-12 or ec-13 to the base station 3c-02 or the MM function 3c-03 that has transmitted the NG3_Conn_Release Request 3c-09 or 3c-17 to notify of the release of the NG3 connection.

The SM function 3c-04 may include an address of the UP GW 3c-05, session information connected between the base station 3c-02 and the UP GW 3c-05, and related QoS information in the NG3_Conn_Release Response 3c-12 or 3c-13 to be transmitted as information for reconfiguring the session during paging hereafter. Further, the SM function 3c-04 stored information of the MM function 3c-03 in order to use the information for transmission of paging for reconnection to the terminal 3c-01 hereafter.

If the MM function 3c-03 receives the NG3_Conn_Release Response 3c-12 from the SM function 3c-04, it may include information for notifying of the release of the NG3 connection between the base station 3c-02 and the UP GW 3c-05 in the NG2_Conn_Release Response 3c-131 to be transmitted to the base station 3c-02, and may release the NG2 connection to the base station 3c-02.

After the MM function 3c-03 transmits the NG2_Conn_Release Response 3c-131 to the base station 3c-02 and releases the NG2 connection, it considers that the terminal 3c-01 has entered into an idle mode, at 3c-16.

If the base station 3c-02 receives the NG2_Conn_Release Response 3c-131 and the NG3_Conn_Release response 3c-13 from the MM function 3c-03 and the SM function 3c-04, it releases the NG2 connection and the NG3 connection.

As another embodiment of the present disclosure, in the wireless communication system to which network slices are applied, an NG3 connection release procedure through transmission of the NG3_Conn_Release Request between the base station 3c-02 and the MM function 3c-03 may be individually transmitted to each SM function that is included in each slice through which the terminal 3c-01 has been serviced, and may be individually performed through the SM function and the UP GW included in each slice.

Figure 3D:
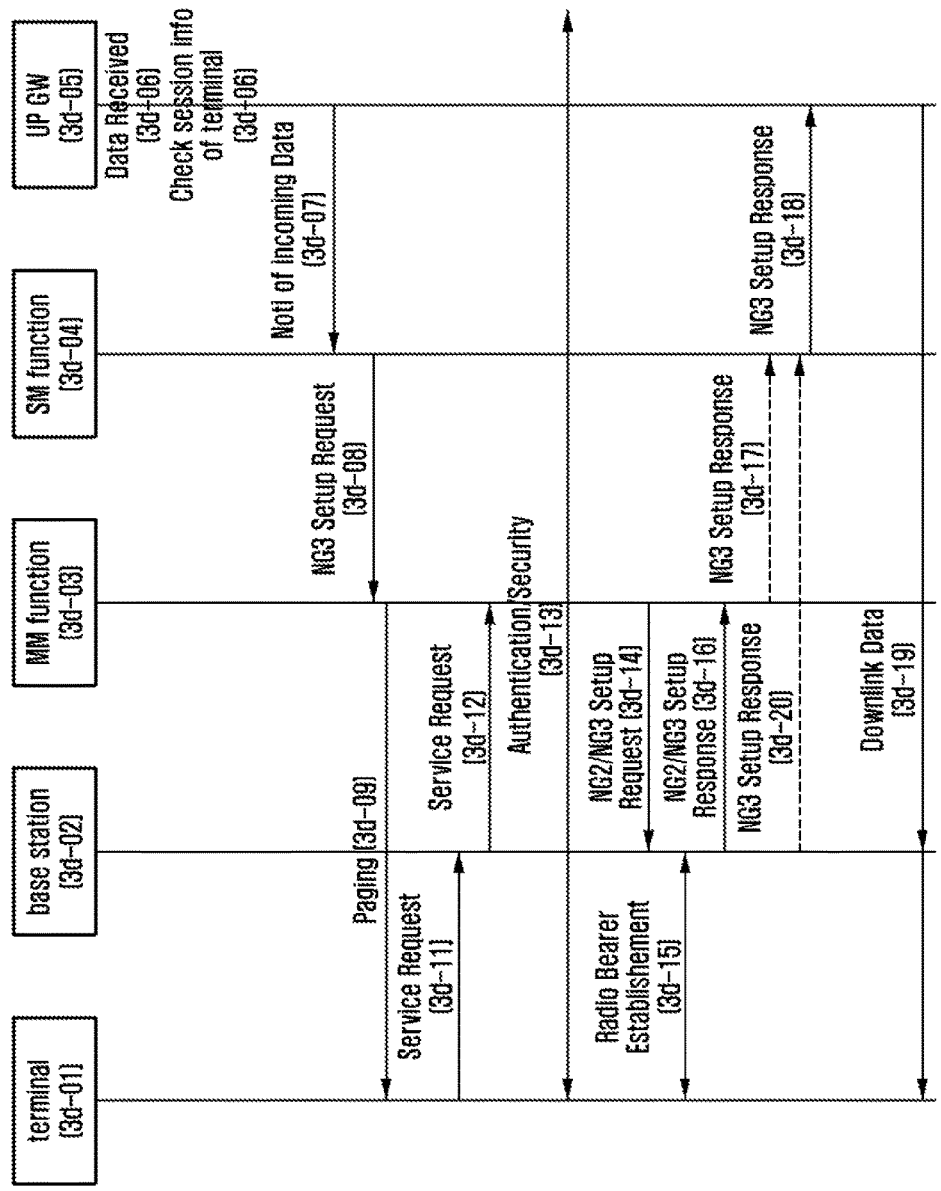
FIG. 3D is a diagram illustrating a network reconnection procedure after paging of a terminal in a wireless communication system according to an embodiment of the present disclosure.

FIG. 3D exemplifies a procedure in which paging is performed with respect to a terminal 3d-01 that is in an idle state, and thereafter, the terminal 3d-01 performs network reconnection in a wireless communication system according to an embodiment of the present disclosure.

Referring to FIG. 3D, if an UP GW 3d-05 receives data to be transmitted to the terminal 3d-01, at 3d-06, it checks session information that can transmit the data to the terminal 3d-01.

If the UP GW 3d-05 is unable to check the session information of the terminal 3d-01 or checks that the session with the terminal 3d-01 has been released, it notifies an SM function 3d-04 that is connected to the UP GW itself that the data has come to the terminal 3d-01, at 3d-07. In this case, information on data sessions may be included therein. The information on the data sessions may be PDU session information and may be a PDU session identifier.

After receiving a notification of incoming data, at 3d-07, that notifies of reception of data to be transmitted to the terminal 3d-01 from the UP GW 3d-05, the SM function 3d-04 transmits an NG3 setup request 3d-08 to an MM function 3d-03. In this case, the NG3 setup request 3d-08 may include at least one of an address of the UP GW 3d-05, data session that is configured between the terminal 3d-01 and the UP GW 3d-05 and QoS information, and an IP address of the terminal 3d-01 to be used for the data session with the UP GW 3d-05. In this case, the MM function 3d-03 to which the NG3 setup request 3d-08 is to be transmitted may be selected using MM function information stored in the SM function 3d-04 during the NG3 release procedure if the terminal 3d-01 enters into an idle mode or by other methods.

After receiving the NG3 setup request 3d-08 from the SM function 3d-04, the MM function 3d-03 transmits paging 3d-09 to the terminal 3d-01 through base stations including a base station 3d-02.

The terminal 3d-01 configures a connection for wireless resource allocation to the base station 3d-02 after checking the existence of data to be received by the terminal itself through reception of the paging 3d-09. Thereafter, the terminal 3d-01 transmits to the base station 3d-02 a service request 3d-11 to be transferred to the MM function 3d-03, at 3d-12.

The MM function 3d-03 performs authentication and security setup procedure with the terminal 3d-01 after receiving the service request 3d-11 from the terminal 3d-01 through the base station 3d-02, at 3d-13.

Through the authentication and security procedure, i.e., at 3d-13, the MM function 3d-03 checks whether the terminal 3d-01 is a permitted straight terminal. Thereafter, the MM function 3d-03 transmits to the base station 3d-02 an NG2/NG3 setup request 3d-14 for requesting setup of an NG2/NG3 connection. In this case, the NG2/NG3 setup request may include at least one of an address of the SM function 3d-04 and an address of the UP GW 3d-05 for the NG3 connection, flow information related to data that is received at 3d-06 and QoS information, PDU session information to which a flow belongs, and an IP address of the terminal 3d-01 to be used for the data session with the UP GW 3d-05. The PDU session information may be a PDU session identifier.

After receiving the NG2/NG3 setup request from the MM function 3d-03, the base station 3d-02 performs radio bearer establishment 3d-15 that is a wireless resource allocation procedure for data transmission/reception in the session related to the data with the terminal 3d-01. In this case, during the radio bearer establishment 3d-15, the base station 3d-02 may notify the terminal 3d-01 of at least one of an address of the SM function 3d-04 and an address of the UP GW 3d-05, flow information related to data that is received at 3d-06 and QoS information, PDU session information to which a flow belongs, and an IP address of the terminal 3d-01 to be used for the data session with the UP GW 3d-05.

After completing the radio bearer establishment 3d-15 with the terminal 3d-01, the base station 3d-02 transmits an NG2/NG3 setup response 3d-16 to the MM function 3d-03.

The base station 3d-02 may transmit a separate NG3 setup response 3d-20 to the SM function 3d-04 for NG3 connection setup with the UP GW 3d-05. In this case, the NG3 setup response 3d-17 may include information related to the corresponding session, such as an address of the base station that is necessary for the NG3 connection setup and QoS information of wireless resources that is configured through the radio bearer establishment, to be transmitted.

As another embodiment of the present disclosure, the base station 3d-02 does not transmit the NG3 setup response, but the MM function 3d-03 may transmit the NG3 setup response 3d-17 to the SM function 3d-04 after receiving the NG2/NG3 setup response 3d-16 from the base station 3d-02.

The SM function 3*d*-04 transmits to the UP GW 3*d*-05 an NG3 setup response 3*d*-18 for notifying that the NG3 connection has been configured after receiving the NG3 setup response 3*d*-17 or 3*d*-20 from the base station 3*d*-02 or the MM function 3*d*-03. In this case, the NG3 setup response 3*d*-18 may include information that is necessary for the NG3 connection, such as an address of the base station 3*d*-02, QoS information of a flow to transmit the data, and related session information.

After receiving the NG3 setup response 3*d*-18, the UP GW 3*d*-05 configures the NG3 connection to the base station 3*d*-02 using information that is included in the NG3 setup response, and transmits data 3*d*-19 to the base station 3*d*-02 through the corresponding NG3 connection.

The data 3*d*-19 that is transmitted to the base station 3*d*-02 is transmitted to the terminal 3*d*-01 using wireless resources that are configured at 3*d*-15.

Figure 3E:
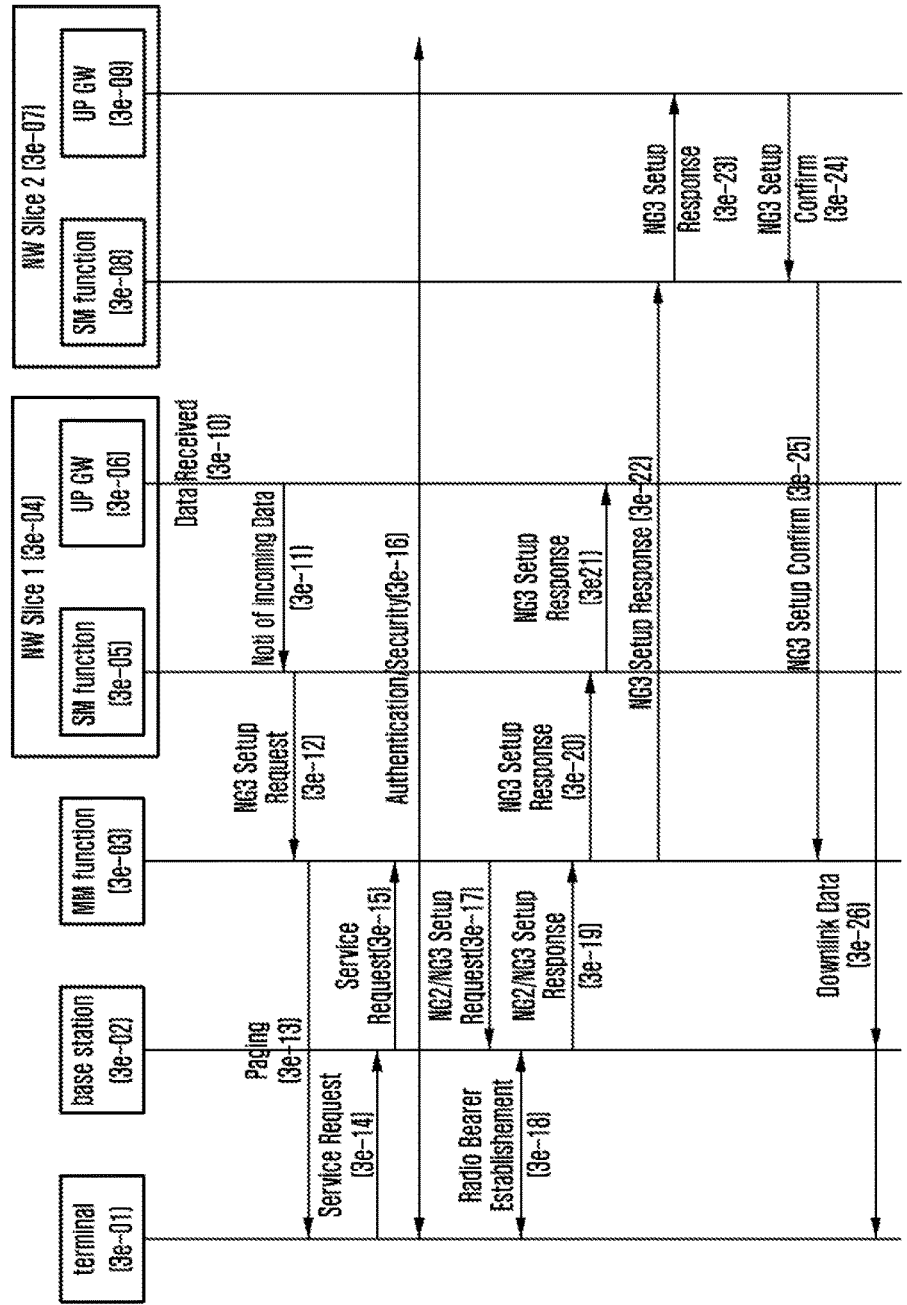
FIG. 3E is a diagram illustrating a network reconnection procedure of a terminal in a wireless communication system to which network slices are applied according to an embodiment of the present disclosure.

FIG. 3E exemplifies a procedure in which paging is performed with respect to a terminal 3*e*-01 that is in an idle state, and thereafter, the terminal 3*e*-01 performs reconnection with network functions of network slices through which the terminal previously performed data communication in a wireless communication system that supports the network slices according to an embodiment of the present disclosure.

Referring to FIG. 3E, if an UP GW 3*e*-06 that belongs to NW slice 1 3*e*-04 receives data to be transmitted to the terminal 3*e*-01, at 3*e*-10, it checks session information that can transmit the data to the terminal 3*e*-01. If the UP GW 3*e*-06 is unable to check the session information of the terminal 3*e*-01 or checks that the session with the terminal 3*e*-01 has been released, it notifies an SM function 3*e*-05 that is connected to the terminal itself that the data has come to the terminal 3*e*-01, at 3*e*-11. In this case, information on data sessions may be included therein. The information on the data sessions may be PDU session information and may be a PDU session identifier.

After receiving a notification of incoming data at 3*e*-11 that notifies of reception of data to be transmitted to the terminal 3*e*-01 from the UP GW 3*e*-06, the SM function 3*e*-05 that belongs to the NW slice 1 3*e*-04 transmits an NG3 setup request 3*e*-12 to an MM function 3*e*-03. In this case, the NG3 setup request 3*e*-12 may include at least one of an address of the UP GW 3*e*-06, data session that is configured between the terminal 3*e*-01 and the UP GW 3*e*-06 and QoS information, and an IP address of the terminal 3*e*-01 to be used for the data session with the UP GW 3*e*-06. In this case, the MM function 3*e*-03 to which the NG setup request 3*e*-12 is to be transmitted may be selected using MM function information stored in the SM function 3*e*-05 during the NG3 release procedure if the terminal 3*e*-01 enters into an idle mode or by other methods.

After receiving the NG3 setup request 3*e*-12 from the SM function 3*e*-05, the MM function 3*e*-03 may transmit paging 3*e*-13 to the terminal 3*e*-01 through base stations including a base station 3*e*-02.

The terminal 3*e*-01 configures a connection for wireless resource allocation to the base station 3*e*-02 after checking the existence of data to be received by the terminal itself through reception of the paging 3*e*-13. Thereafter, the terminal 3*e*-01 transmits to the base station 3*e*-02 a service request 3*e*-14 to be transferred to the MM function 3*e*-03.

If the service request 3*e*-14 is received from the terminal 3*e*-01, the base station 3*e*-02 transmits the service request to the MM function 3*e*-03, at 3*e*-15.

The MM function 3*e*-03 performs authentication and security setup procedure with the terminal 3*e*-01 after receiving the service request at 3*e*-15 from the terminal 3*e*-01 through the base station 3*e*-02, at 3*e*-16.

Through the authentication and security procedure at 3*e*-16, the MM function 3*e*-03 checks whether the terminal 3*e*-01 is a permitted straight terminal, and then transmits to the base station 3*e*-02 an NG2/NG3 setup request 3*e*-17 for requesting setup of an NG2/NG3 connection. In this case, the NG2/NG3 setup request may be used for NG3 connection with all NW slices including NW slice 1 3*e*-04 and NW slice 2 3*e*-07, through which communication was performed before the terminal 3*e*-01 entered into an idle state. For this, the NG2/NG3 setup request may include at least one of an address of the SM function 3*e*-05 that belongs to the NW slice 1 3*e*-04 and an address of the UP GW 3*e*-06, data session information configured with the UP GW 3*e*-06 and QoS information, an IP address of the terminal 3*e*-01 to be used for communication with the UP GW 3*e*-06, an address of an SM function 3*e*-08 that belongs to the NW slice 2 3*e*-07 and an address of an UP GW 3*e*-09, data session information configured with the UP GW 3*e*-09 and QoS information, an IP address of the terminal 3*e*-01 to be used for communication with the UP GW 3*e*-09, flow information related to data received at 3*e*-10 and QoS information, and PDU session information to which the flow belongs. The PDU session information may be a PDU session identifier.

As the above-described information, information that the MM function 3*e*-03 received from the SM function 3*e*-05 and the SM function 3*e*-08 when the terminal 3*e*-01 entered into an idle state may be used.

After receiving the NG2/NG3 setup request 3*e*-17 from the MM function 3*e*-03, the base station 3*e*-02 performs radio bearer establishment 3*e*-18 that is a wireless resource allocation procedure with the terminal 3*e*-01. In this case, during the procedure of the radio bearer establishment 3*e*-18, the base station 3*e*-02 may transfer to the terminal 3*e*-01 at least one of an address of the SM function 3*e*-05 that belongs to the NW slice 1 3*e*-04 that is received from the NG2/NG3 setup request 3*e*-17 and an address of the UP GW 3*e*-06, data session information configured with the UP GW 3*e*-06 and QoS information, an IP address of the terminal 3*e*-01 to be used for communication with the UP GW 3*e*-06, an address of the SM function 3*e*-08 that belongs to the NW slice 2 3*e*-07 and an address of the UP GW 3*e*-09, data session information configured with the UP GW 3*e*-09 and QoS information, an IP address of the terminal 3*e*-01 to be used for communication with the UP GW 3*e*-09, flow information related to data received at 3*e*-10 and QoS information, and PDU session information to which the flow belongs.

The terminal 3*e*-01 reconfigures an internal connection of the terminal using information on the NW slice 1 3*e*-04 and the NW slice 2 3*e*-07 transferred by the base station 3*e*-02 during the radio bearer establishment 3*e*-18, addresses of the SM function and the UP GW function, and allocated session information.

After completing the radio bearer establishment 3*e*-18 with the terminal 3*e*-01, the base station 3*e*-02 transmits an NG2/NG3 setup response 3*e*-19 to the MM function 3*e*-03.

After receiving the NG2/NG3 setup response 3*e*-19 from the base station 3*e*-02, the MM function 3*e*-03 transmits NG3 setup responses 3*e*-20 and 3*e*-22 to SM functions that belong to each NW slice (in this embodiment, SM function 3*e*-05 and SM function 3*e*-08).

As another embodiment of the present disclosure, the base station 3*e*-02 may transmit a separate NG3 setup response to the SM function 3*e*-05 and the SM function 3*e*-08 for NG3 connection setup with the UP GW 3*e*-06.

The NG3 setup responses 3e-20 and 3e-22 to be transmitted may include information related to the corresponding session, such as an address of the base station that is necessary for the NG3 connection setup and QoS information of wireless resources configured through the radio bearer establishment.

The SM function 3e-05 transmits to the UP GW 3e-06 an NG3 setup response 3e-21 for notifying that the NG3 connection has been configured after receiving the NG3 setup response 3e-20 from the base station 3e-02 or the MM function 3e-03. In this case, the NG3 setup response 3e-21 may include information that is necessary for the NG3 connection, such as an address of the base station 3e-02, QoS information of a flow to transmit the data received at 3e-10, and related session information.

After receiving the NG3 setup response 3e-21, the UP GW 3e-06 configures the NG3 connection to the base station 3e-02 using information that is included in the NG3 setup response, and transmits data to the base station 3e-02 through the corresponding NG3 connection, at 3e-26.

After receiving the NG3 setup response 3e-22 from the base station 3e-02 or the MM function 3e-03, the SM function 3e-08 transmits an NG3 setup response 3e-23 for notifying the setup of the NG3 connection to the UP GW 3e-09. In this case, the NG3 setup response 3e-23 may include information that is necessary for the NG3 connection, such as an address of the base station 3e-02 and related session information.

After receiving the NG3 setup response 3e-23, the UP GW 3e-09 may configure the NG3 connection to the base station 3e-02 using information included in the NG3 setup response, and may transmit to the SM function 3e-08 an NG3 setup confirm 3e-24 for notifying that the corresponding NG3 connection has been completed.

After receiving the NG3 setup confirm 3e-24 from the UP GW 3e-09, the SM function 3e-08 may transfer the NG3 setup confirm to the MM function 3e-03 at 3e-25 to notify the MM function 3e-03 that the NG3 connection has been configured between the base station 3e-02 and the UP GW 3e-09 of the NW slice 2 3e-07.

Figure 3F:
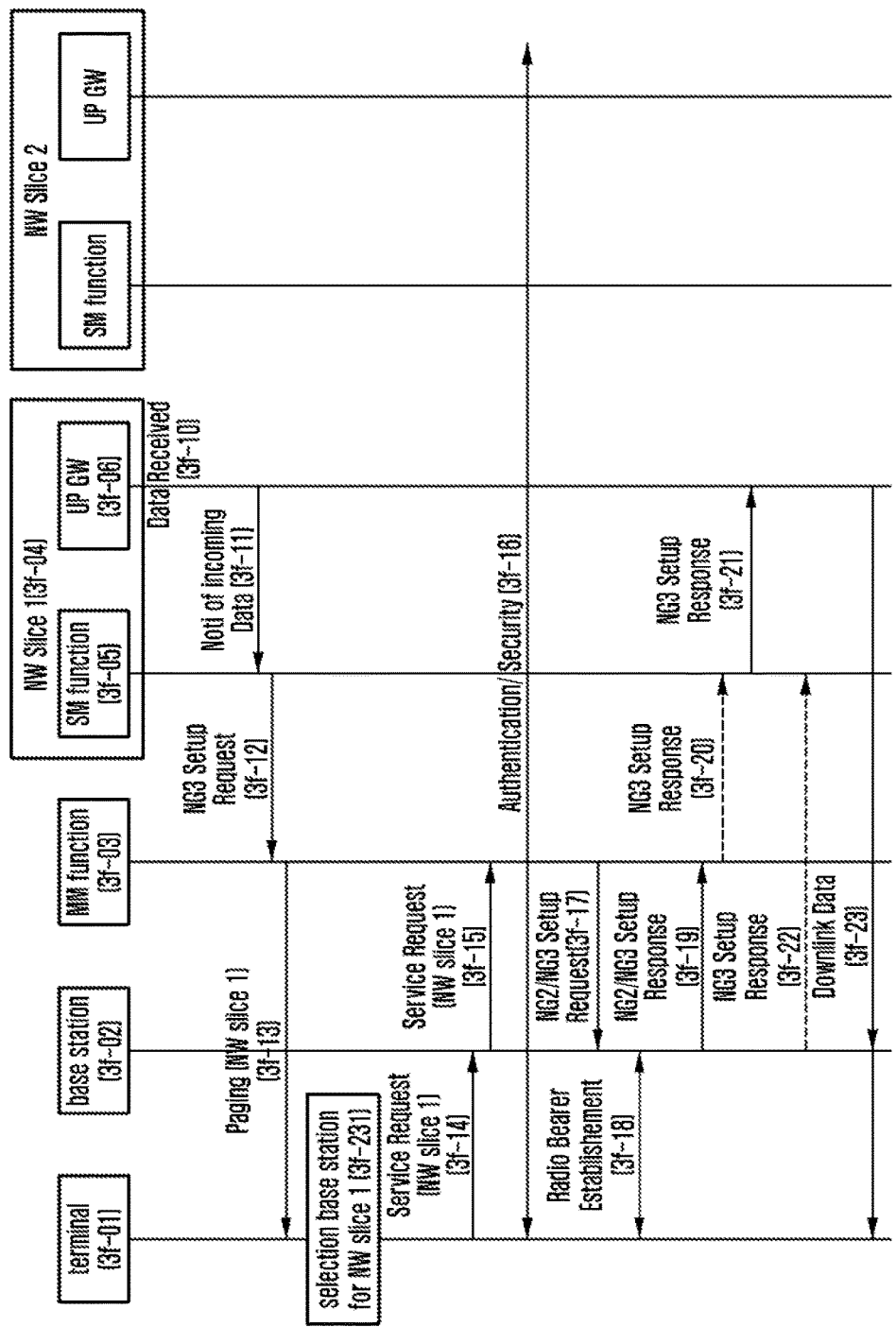
FIG. 3F is a diagram illustrating a network reconnection procedure of a terminal according to an embodiment of the present disclosure.

FIG. 3F exemplifies a procedure in which paging that includes slice information in which data is received is performed with respect to a terminal 3f-01 that is in an idle state, and thereafter, the terminal 3f-01 performs reconnection with network functions of network slices through which the terminal previously performed data communication in a wireless communication system that supports the network slices according to an embodiment of the present disclosure.

Referring to FIG. 3F, if an UP GW 3f-06 that belongs to NW slice 1 3f-04 receives data to be transmitted to the terminal 3f-01, at 3f-10, it checks session information that can transmit the data to the terminal 3f-01. If the UP GW 3f-06 is unable to check the session information of the terminal 3f-01 or checks that the session with the terminal 3f-01 has been released, it notifies an SM function 3f-05 that is connected to the terminal itself that the data has come to the terminal 3f-01, at 3f-11. In this case, information on data sessions may be included therein. The information on the data sessions may be PDU session information and may be a PDU session identifier.

After receiving a notification of incoming data at 3f-11 that notifies of reception of data to be transmitted to the terminal 3f-01 from the UP GW 3f-06, the SM function 3f-05 that belongs to the NW slice 1 3f-04 transmits an NG3 setup request 3f-12 to an MM function 3f-03. In this case, the NG3 setup request 3f-12 may include at least one of an address of the UP GW 3f-06, data session that is configured between the terminal 3f-01 and the UP GW 3f-06 and QoS information, and an IP address of the terminal 3f-01 to be used for the data session with the UP GW 3f-06. In this case, the MM function 3f-03 to which the NG setup request 3f-12 is to be transmitted may be selected using MM function information stored in the SM function 3f-05 during the NG3 release procedure if the terminal 3f-01 enters into an idle mode or by other methods.

After receiving the NG3 setup request 3f-12 from the SM function 3f-05, the MM function 3f-03 may transmit paging 3f-13 to the terminal 3f-01 through base stations including a base station 3f-02. In this case, the MM function 3f-03 may include information that may indicate the NW slice 1 3f-04 that includes the UP GW 3f-06 in the paging 3f-13. In this case, the information that may indicate the NW slice 1 3f-04 may include an ID of an inherent NW slice allocated for each NW slice or a paging ID of a terminal for each NW slice that can discriminate the terminal that can receive paging for each NW slice.

The terminal 3f-01 receives the paging 3f-13, and checks existence of data that the terminal itself should receive from the NW slice 1 3f-04. Thereafter, the terminal 3f-01 selects a base station through which the corresponding slice can be connected through checking wireless connection technology related to the NW slice 1 or conditions of the base station, at 3f-231.

After selecting the base station 3f-02 that satisfies the wireless connection technology related to the NW slice 1 3f-04 or the conditions of the base station, the terminal 3f-01 configures a connection for wireless resource allocation to the base station 3f-02. Thereafter, the terminal 3f-01 transmits to the base station 3f-02 a service request 3f-14 to be transferred to the MM function 3f-03. In this case, the service request 3f-14 may include NW slice 1 information (e.g., id of the NW slice or temporary ID of the terminal allocated for each NW slice) or PDU session information (e.g., PDU session identifier).

The base station 3f-02 transfers the service request 3f-14 that is received from the terminal 3f-01 to the MM function 3f-03, at 3f-15.

The MM function 3f-03 performs authentication and security setup procedure with the terminal 3f-01 after receiving the service request at 3f-15 that has come from the base station 3f-02, at 3f-16. In this case, the authentication and security setup procedure may include an authorization procedure for authorizing whether to use resources of the NW slice 1 3f-04.

Through the authentication and security procedure at 3f-16, the MM function 3f-03 checks whether the terminal 3f-01 is a permitted straight terminal, and then transmits to the base station 3f-02 an NG2/NG3 setup request 3f-17 for requesting setup of an NG2/NG3 connection. In this case, for the NG3 connection with the UP GW 3f-06 that is included in the NW slice 1 3f-04, the NG2/NG3 setup request may include at least one of information on the NW slice 1 3f-04, an address of the SM function 3f-05 that is included in the NW slice 1 3f-04, an address of the UP GW 3f-06, flow information related to data that is received at 3f-10 and QoS information, PDU session information to which the flow belongs, and an IP address of the terminal 3f-01 to be used for data session with the UP GW 3f-06. The PDU session information may be a PDU session identifier.

After receiving the NG2/NG3 setup request from the MM function 3f-03, the base station 3f-02 performs radio bearer establishment 3f-18 that is a wireless resource allocation procedure for data transmission/reception between the terminal 3f-01 and the session related to the data that belongs to the NW slice 1 3f-04. In this case, during the procedure of the radio bearer establishment 3f-18, the base station 3f-02 may notify the terminal 3f-01 of at least one of an information of the NW slice 1 3f-04, an address of the SM function 3f-05, an address of the UP GW 3f-06, flow information related to data that is received at 3f-10 and QoS information, PDU session information to which the flow belongs, and an IP address of the terminal 3f-01 to be used for data session with the UP GW 3f-06. In an embodiment of FIG. 3F, the terminal does not configure a connection or a bearer with respect to all slices or all PDU sessions, but may configure a connection only with respect to the slice or PDU session having data to be received. For this, in an embodiment of the present disclosure, slice information or PDU session information may be used.

After completing the radio bearer establishment 3f-18 with the terminal 3f-01, the base station 3f-02 transmits an NG2/NG3 setup response 3f-19 to the MM function 3f-03.

As another embodiment of the present disclosure, the base station 3f-02 may transmit a separate NG3 setup response 3f-22 to the SM function 3f-05 for NG3 connection setup with the UP GW 3f-06. In this case, the NG3 setup response 3f-22 may include information related to the corresponding session, such as an address of the base station that is necessary for the NG3 connection setup and QoS information of wireless resources configured through the radio bearer establishment, to be transmitted.

As another embodiment of the present disclosure, the base station 3f-02 does not transmit the NG3 setup response, and the MM function 3f-03 may transmit an NG3 setup response 3f-20 to the SM function 3f-05 after receiving the NG2/NG3 setup response 3f-19 from the base station 3f-02.

The SM function 3f-05 transmits to the UP GW 3f-06 an NG3 setup response 3f-21 for notifying that the NG3 connection has been configured after receiving the NG3 setup response 3f-20 or 3f-22 from the base station 3f-02 or the MM function 3f-03. In this case, the NG3 setup response 3f-21 may include information that is necessary for the NG3 connection, such as an address of the base station 3f-02, QoS information of a flow to transmit the data received at 3f-10, and related session information.

After receiving the NG3 setup response 3f-21, the UP GW 3f-06 configures the NG3 connection to the base station 3f-02 using information that is included in the NG3 setup response, and transmits data to the base station 3f-02 through the corresponding NG3 connection, at 3f-23.

The data that is transmitted to the base station 3f-02 is transmitted to the terminal 3f-01 using wireless resources configured through the radio bearer establishment 3f-18.

According to the above-described method according to an embodiment of the present disclosure, if there is information to be transmitted to the terminal that is in an idle state, using slice information or PDU session information, the bearer configuration is not performed with respect to all slices or all PDU sessions, but the connection and bearer configuration are performed only with respect to a slice or a PDU session having data to be transmitted to the terminal, and thus the network can be efficiently operated.

Figure 3G:
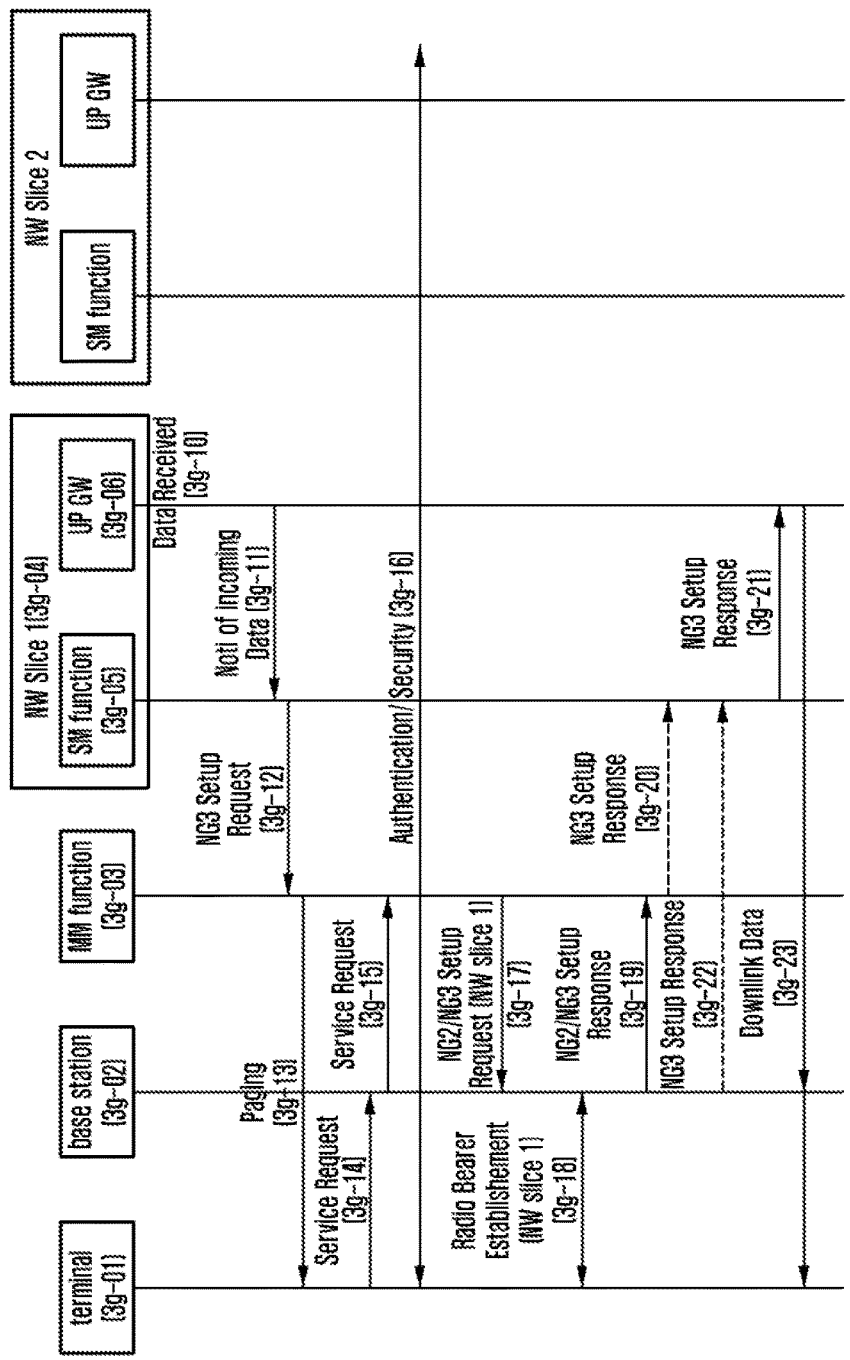
FIG. 3G is a diagram illustrating a network reconnection procedure of a terminal according to another embodiment of the present disclosure.

FIG. 3G exemplifies a procedure in which paging is performed with respect to a terminal 3g-01 that is in an idle state, and thereafter, the terminal 3g-01 performs reconnection with network functions of network slices through which the terminal previously performed data communication in a wireless communication system that supports the network slices according to an embodiment of the present disclosure.

Referring to FIG. 3G, if an UP GW 3g-06 that belongs to NW slice 1 3g-04 receives data to be transmitted to the terminal 3g-01, at 3g-10, it checks session information that can transmit the data to the terminal 3g-01. If the UP GW 3g-06 is unable to check the session information of the terminal 3g-01 or checks that the session with the terminal 3g-01 has been released, it notifies an SM function 3g-05 that is connected to the terminal itself that the data has come to the terminal 3g-01, at 3g-11. In this case, information on data sessions may be included therein. The information on the data sessions may be PDU session information and may be a PDU session identifier.

After receiving a notification of incoming data at 3g-11 that notifies of reception of data to be transmitted to the terminal 3g-01 from the UP GW 3g-06, the SM function 3g-05 that belongs to the NW slice 1 3g-04 transmits an NG3 setup request 3g-12 to an MM function 3g-03. In this case, the NG3 setup request 3g-12 may include at least one of an information of the NW slice 1 3f-04, address of the UP GW 3g-06, data session that is configured between the terminal 3g-01 and the UP GW 3g-06 and QoS information, and an IP address of the terminal 3g-01 to be used for the data session with the UP GW 3g-06. In this case, the MM function 3g-03 to which the NG setup request 3g-12 is to be transmitted may be selected using MM function information stored in the SM function 3g-05 during the NG3 release procedure if the terminal 3g-01 enters into an idle mode or by other methods.

After receiving the NG3 setup request 3g-12 from the SM function 3g-05, the MM function 3g-03 transmits paging 3g-13 to the terminal 3g-01 through base stations including a base station 3g-02.

The terminal 3g-01 receives the paging 3g-13, checks existence of data that the terminal itself should receive, and then configures a connection for wireless resource allocation to the base station 3g-02. Thereafter, the terminal 3g-01 transmits to the base station 3g-02 a service request 3g-14 to be transferred to the MM function 3g-03. The base station 3g-02 transfers the service request 3g-14 that is received from the terminal 3g-01 to the MM function 3g-03, at 3g-15. The service request 3g-14 may include NW slice 1 information (e.g., id of the NW slice or temporary ID of the terminal allocated for each NW slice) or PDU session information (e.g., PDU session identifier).

The MM function 3g-03 performs authentication and security setup procedure with the terminal 3g-01 after receiving the service request at 3g-15 that has come from the base station 3g-02, at 3g-16. In this case, the authentication and security setup procedure may include an authorization procedure for authorizing whether to use resources of the NW slice 1 3g-04.

Through the authentication and security procedure 3g-16, the MM function 3g-03 checks whether the terminal 3g-01 is a permitted straight terminal, and then transmits to the base station 3g-02 an NG2/NG3 setup request 3g-17 for requesting setup of an NG2/NG3 connection. In this case, for the NG3 connection with the UP GW 3g-06 that is included in the NW slice 1 3g-04, the NG2/NG3 setup request may include at least one of information on the NW slice 1 3g-04, an address of the SM function 3g-05 that is included in the NW slice 1 3g-04, an address of the UP GW 3g-06, flow information related to data that is received at operation 3g-10 and QoS information, PDU session information to which the flow belongs, and an IP address of the terminal 3g-01 to be used for data session with the UP GW 3g-06. The PDU session information may be a PDU session identifier.

After receiving the NG2/NG3 setup request from the MM function 3g-03, the base station 3g-02 performs radio bearer establishment 3g-18 that is a wireless resource allocation procedure for data transmission/reception between the terminal 3g-01 and the session related to the data that belongs to the NW slice 1 3g-04. In this case, during the procedure of the radio bearer establishment 3g-18, the base station 3g-02 may notify the terminal 3g-01 of at least one of an information of the NW slice 1 3g-04, an address of the SM function 3g-05, an address of the UP GW 3g-06, flow information related to data that is received at operation 3g-10 and QoS information, PDU session information to which the flow belongs, and an IP address of the terminal 3g-01 to be used for data session with the UP GW 3g-06. In an embodiment of FIG. 3G, the terminal does not configure a connection or a bearer with respect to all slices or all PDU sessions, but may configure a connection only with respect to the slice or PDU session having data to be received. For this, in an embodiment of the present disclosure, slice information or PDU session information may be used.

After completing the radio bearer establishment 3g-18 with the terminal 3g-01, the base station 3g-02 transmits an NG2/NG3 setup response 3g-19 to the MM function 3g-03.

As another embodiment of the present disclosure, the base station 3g-02 may transmit a separate NG3 setup response 3g-22 to the SM function 3g-05 for NG3 connection setup with the UP GW 3g-06. In this case, the NG3 setup response 3g-22 may include information related to the corresponding session, such as an address of the base station that is necessary for the NG3 connection setup and QoS information of wireless resources configured through the radio bearer establishment, to be transmitted.

As another embodiment of the present disclosure, the base station 3g-02 does not transmit the NG3 setup response, and the MM function 3g-03 may transmit an NG3 setup response 3g-20 to the SM function 3g-05 after receiving the NG2/NG3 setup response 3g-19 from the base station 3g-02.

The SM function 3g-05 transmits to the UP GW 3g-06 an NG3 setup response 3g-21 for notifying that the NG3 connection has been configured after receiving the NG3 setup response 3g-20 or 3g-22 from the base station 3g-02 or the MM function 3g-03. In this case, the NG3 setup response 3g-21 may include information that is necessary for the NG3 connection, such as an address of the base station 3g-02, QoS information of a flow to transmit the data 3g-10, and related session information.

After receiving the NG3 setup response 3g-21, the UP GW 3g-06 configures the NG3 connection to the base station 3g-02 using information that is included in the NG3 setup response, and transmits data to the base station 3g-02 through the corresponding NG3 connection (3g-23).

The data 3g-23 that is transmitted to the base station 3g-02 is transmitted to the terminal 3g-01 using wireless resources configured through the radio bearer establishment 3g-18.

According to the above-described method according to an embodiment of the present disclosure, if there is information to be transmitted to the terminal that is in an idle state, using slice information or PDU session information, the bearer configuration or session configuration is not performed with respect to all slices or all PDU sessions, but the connection and bearer configuration are performed only with respect to a slice or a PDU session having data to be transmitted to the terminal, and thus the network can be efficiently operated.

Figure 3H:
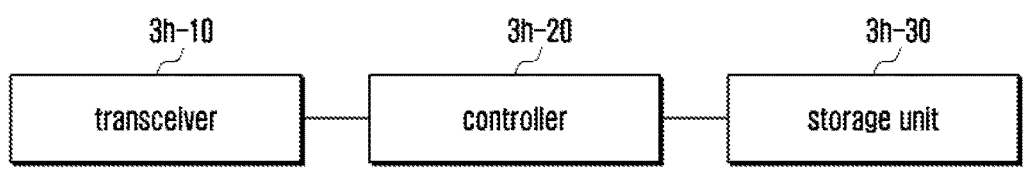
FIG. 3H is a diagram illustrating the structure of a terminal according to an embodiment of the present disclosure.

FIG. 3H is a diagram illustrating the structure of a terminal according to an embodiment of the present disclosure.

Referring to FIG. 3H, a terminal may include a transceiver unit 3h-10, a controller 3h-20, and a storage unit 3h-30. The controller according to the present disclosure may be defined as a circuit, an application specific integrated circuit, or at least one processor.

The transceiver unit 3h-10 may transmit and receive signals with another network entity. The transceiver unit 3h-10 may transmit and receive signals under the control of the controller 3h-20.

The controller 3h-20 may control the whole operation of the terminal according to an embodiment proposed in the present disclosure. The controller 3h-20 may control the operation of the terminal according to the third embodiment of the present disclosure. For example, the controller 3h-20 may control the operation of the terminal as described above with reference to FIGS. 3A to 3G.

The storage unit 3h-30 may store therein at least one of information that is transmitted and received through the transceiver unit 3h-10 and information that is generated through the controller 3h-20. Further, the storage unit 3h-30 may store therein information and codes for operating the controller 3h-20.

Figure 3I:
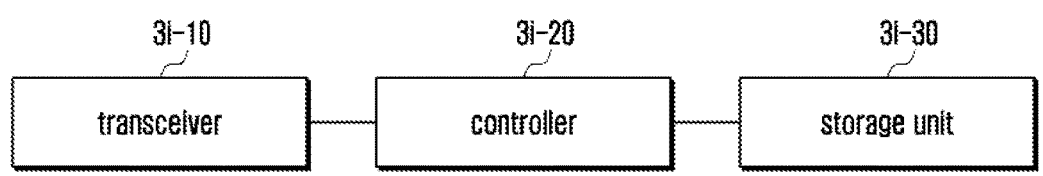
FIG. 3I is a diagram illustrating the structure of a base station according to an embodiment of the present disclosure.

FIG. 3I is a diagram illustrating the structure of a base station according to an embodiment of the present disclosure.

Referring to FIG. 3I, a base station may include a transceiver unit 3i-10, a controller 3i-20, and a storage unit 3i-30. The controller according to the present disclosure may be defined as a circuit, an application specific integrated circuit, or at least one processor.

The transceiver unit 3i-10 may transmit and receive signals with another network entity. The transceiver unit 3i-10 may transmit and receive signals under the control of the controller 3i-20.

The controller 3i-20 may control the whole operation of the base station according to an embodiment proposed in the present disclosure. The controller 3i-20 may control the operation of the base station according to the third embodiment of the present disclosure. For example, the controller 3i-20 may control the operation of the base station as described above with reference to FIGS. 3A to 3G.

The storage unit 3i-30 may store therein at least one of information that is transmitted and received through the transceiver unit 3i-10 and information that is generated through the controller 3i-20. Further, the storage unit 3i-30 may store therein information and codes for operating the controller 3i-20.

Figure 3J:
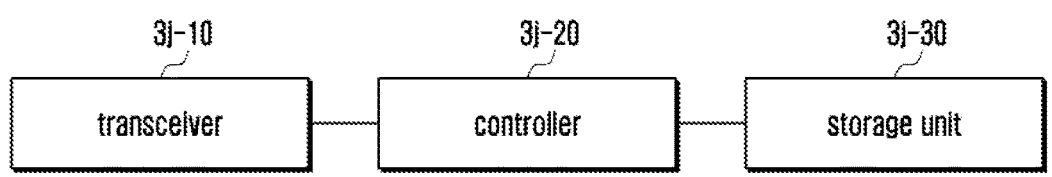
FIG. 3J is a diagram illustrating the structure of a mobility management (MM) function according to an embodiment of the present disclosure.

FIG. 3J is a diagram illustrating the structure of an MM function according to an embodiment of the present disclosure.

Referring to FIG. 3J, the MM function may include a transceiver unit 3j-10, a controller 3j-20, and a storage unit 3j-30. The controller according to the present disclosure may be defined as a circuit, an application specific integrated circuit, or at least one processor.

The transceiver unit 3j-10 may transmit and receive signals with another network entity. The transceiver unit 3j-10 may transmit and receive signals under the control of the controller 3j-20.

The controller 3j-20 may control the whole operation of the MM function according to an embodiment proposed in the present disclosure. The controller 3j-20 may control the operation of the MM function according to the third embodiment of the present disclosure. For example, the controller 3j-20 may control the operation of the MM function as described above with reference to FIGS. 3A to 3G.

The controller 3j-20 may operate to receive a message that includes session information for a terminal in an idle mode, to transmit a paging message for the terminal based on the message, to receive a service request message for the terminal from a base station, to transmit an interface configuration request message that includes the session information to the base station based on the session information, to receive an interface configuration response message from the base station, and to transmit information for configuring an interface between a UP GW that corresponds to the session information and the base station. In this case, at least one of the interface configuration request message and the service request message may include the session information. The controller 3j-20 may operate to configure a connection only with respect to the UP GW that corresponds to the session information among a plurality of UP GW that are connected before the terminal is switched to the idle mode.

The storage unit 3j-30 may store therein at least one of information that is transmitted and received through the transceiver unit 3j-10 and information that is generated through the controller 3j-20. Further, the storage unit 3j-30 may store therein information and codes for operating the controller 3j-20.

Figure 3K:
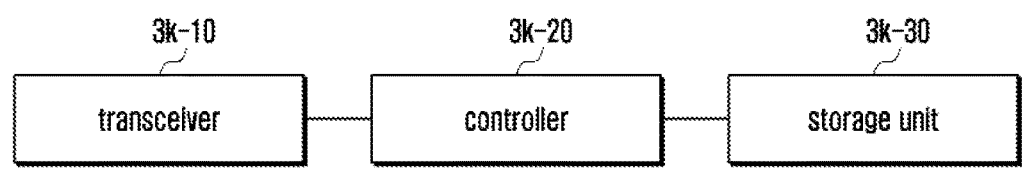
FIG. 3K is a diagram illustrating the structure of a session management (SM) function according to an embodiment of the present disclosure.

FIG. 3K is a diagram illustrating the structure of an SM function according to an embodiment of the present disclosure.

Referring to FIG. 3K, the SM function may include a transceiver unit 3k-10, a controller 3k-20, and a storage unit 3k-30. The controller according to the present disclosure may be defined as a circuit, an application specific integrated circuit, or at least one processor.

The transceiver unit 3k-10 may transmit and receive signals with another network entity. The transceiver unit 3k-10 may transmit and receive signals under the control of the controller 3k-20.

The controller 3k-20 may control the whole operation of the SM function according to an embodiment proposed in the present disclosure. The controller 3k-20 may control the operation of the SM function according to the third embodiment of the present disclosure. For example, the controller 3k-20 may control the operation of the SM function as described above with reference to FIGS. 3A to 3G.

The controller 3k-20 may operate to receive information indicating that there is data to be transmitted from a UP GW to a terminal in an idle mode, to transmit an interface configuration request message that includes session information for the terminal to a MM function entity, and to receive from the MM function entity an interface configuration response message that includes information for configuring an interface between the UP GW that corresponds to the session information and a base station. The controller 3k-20 may operate to configure a connection only with respect to the UP GW that corresponds to the session information among a plurality of UP GWs that are connected before the terminal is switched to the idle mode.

The storage unit 3k-30 may store therein at least one of information that is transmitted and received through the transceiver unit 3k-10 and information that is generated through the controller 3k-20. Further, the storage unit 3k-30 may store therein information and codes for operating the controller 3k-20.

In the detailed embodiments of the present disclosure as described above, the constituent elements included in the present disclosure are described as singular expressions or plural expressions in accordance with the presented embodiments. However, the singular or plural expressions are selected to suit the presented situations for convenience in explanation, and thus the present disclosure is not limited to such singular or plural constituent elements. Even the constituent elements that are expressed by plural expressions may correspond to a singular constituent element, while even the constituent element that is expressed by singular expressions may correspond to plural constituent elements.

Although detailed embodiments of the present disclosure have been described in the specification and drawings, it will be apparent that various modifications are possible within the scope of the present disclosure. Accordingly, the scope of the present disclosure should not be limited to the embodiments as described above, but should be defined by the appended claims below and those equivalent to the scope of the claims.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a mobility management (MM) function entity in a wireless communication system supporting a network slice including a session management (SM) function entity and a user plane gateway (UP GW), the method comprising:
   receiving, from an SM associated with a network slice among a plurality of network slices, a first message for a terminal in an idle mode including session information on the network slice, each of a plurality of sessions being established between the terminal and each of the plurality of network slices respectively;
   transmitting, to a base station, a paging message for the terminal based on the session information included in the first message;
   receiving, from the base station, a second message including a service request message for the terminal; and
   transmitting, to the base station, a setup request message including the session information for activating a session among the plurality of sessions, the session being established between the terminal and the network slice,
   wherein the session information includes identification (ID) on the network slice.

2. The method of claim 1, wherein the session information includes at least one of an ID of the session or quality of service (QoS) information on a data flow associated with the session.

3. The method of claim 1, wherein the first message further includes an ID of the terminal.

4. The method of claim 1, wherein the session information is used to activate only the session between the terminal and the network slice among the plurality of sessions.

5. The method of claim 2, wherein a radio bearer between the terminal and the base station is established based on the QoS information.

6. A method by a base station in a wireless communication system supporting a network slice including a session management (SM) function entity and a user plane gateway (UP GW), the method comprising:
   receiving, from a mobility management (MM) function entity, a paging message for a terminal in an idle mode, the paging message being transmitted by the MM function entity based on a first message including session information on a network slice among a plurality of network slices, and each of a plurality of sessions being established between the terminal and each of the plurality of network slices respectively;
   transmitting, to the MM function entity, a second message including a service request message for the terminal; and receiving, from the MM function entity, a setup request message including session information for activating a session among the plurality of sessions, the session being established between the terminal and the network slice, wherein the session information includes identification (ID) on the network slice.

7. The method of claim 6, wherein the session information includes at least one of an ID of the session and quality of service (QoS) information on a data flow associated with the session.

8. The method of claim 6, wherein the first message further includes an ID of the terminal.

9. The method of claim 6, wherein the session information is used to activate only the session between the terminal and the network slice among the plurality of sessions.

10. The method of claim 7, further comprising:
performing radio resource control (RRC) connection reconfiguration with the terminal based on the QoS information.

11. A mobility management (MM) function entity in a wireless communication system supporting a network slice including a session management (SM) function entity and a user plane gateway (UP GW), the MM function entity comprising:
a transceiver configured to receive, from an SM associated with a network slice among a plurality of network slices, a first message for a terminal in an idle mode including session information on the network slice, each of a plurality of sessions being established between the terminal and each of the plurality of network slices respectively; and
a controller configured to control the transceiver to:
transmit, to a base station, a paging message for the terminal based on the session information in the first message,
receive, from the base station, a second message including a service request message for the terminal, and
transmit, to the base station, a setup request message including the session information for activating a session among the plurality of sessions, the session being established between the terminal and the network slice,
wherein the session information includes identification (ID) on the network slice.

12. The MM function entity of claim 11, wherein the session information includes at least one of an ID of the session and quality of service (QoS) information on a data flow associated with the session.

13. The MM function entity of claim 11, wherein the first message further includes an ID of the terminal.

14. The MM function entity of claim 11, wherein the session information is used to activate only the session between the terminal and the network slice from among the plurality of sessions.

15. The MM function entity of claim 12, wherein a radio bearer between the terminal and the base station is established based on the QoS information.

16. A base station in a wireless communication system supporting a network slice including a session management (SM) function entity and a user plane gateway (UP GW), the base station comprising:
a transceiver configured to receive, from a mobility management (MM) function entity, a paging message for a terminal in an idle mode, the paging message being transmitted by the MM function entity based on a first message including session information on a network slice among a plurality of network slices, and each of a plurality of sessions being established between the terminal and each of the plurality of network slices respectively; and
a controller configured to control the transceiver to:
transmit, to the MM function entity, a second message including a service request message for the terminal, and
receive, from the MM function entity, a setup request message including session information for activating a session among the plurality of sessions, the session being established between the terminal and the network slice,
wherein the session information includes identification (ID) on the network slice.

17. The base station of claim 16, wherein the session information includes at least one of an identification (ID) of the session and quality of service (QoS) information on a data flow associated with the session.

18. The base station of claim 16, wherein the first message further includes an identification (ID) of the terminal.

19. The base station of claim 16, wherein the session information is used to activate only the session between the terminal and the network slice from among the plurality of sessions.

20. The base station of claim 17, wherein the controller is further configured to perform radio resource control (RRC) connection reconfiguration with the terminal based on the QoS information.

* * * * *